(12) United States Patent
Kurihara et al.

(10) Patent No.: US 8,202,459 B2
(45) Date of Patent: Jun. 19, 2012

(54) PROCESS FOR PRODUCING THERMOPLASTIC RESIN MOLDED PRODUCT AND THERMOPLASTIC RESIN PARTICLE COMPOSITION

(75) Inventors: Fumio Kurihara, Tokyo (JP); Masamitsu Takami, Tokyo (JP); Kazumasa Oota, Tokyo (JP); Tetsuya Kubota, Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 0 days.

(21) Appl. No.: 12/935,828

(22) PCT Filed: Mar. 27, 2009

(86) PCT No.: PCT/JP2009/056263
§ 371 (c)(1),
(2), (4) Date: Dec. 20, 2010

(87) PCT Pub. No.: WO2009/123046
PCT Pub. Date: Oct. 8, 2009

(65) Prior Publication Data
US 2011/0114902 A1 May 19, 2011

(30) Foreign Application Priority Data

Mar. 31, 2008 (JP) .................. 2008-091688
Jan. 28, 2009 (JP) .................. 2009-016816
Jan. 28, 2009 (JP) .................. 2009-016817

(51) Int. Cl.
*H05B 6/00* (2006.01)
(52) U.S. Cl. ......... 264/264; 264/463; 524/572; 524/575
(58) Field of Classification Search .................. 264/460, 264/463; 524/572, 575
See application file for complete search history.

(56) References Cited

U.S. PATENT DOCUMENTS

| | | | | |
|---|---|---|---|---|
| 5,639,416 A | * | 6/1997 | Pennisi et al. | 264/571 |
| 2002/0151624 A1 | * | 10/2002 | Kobayashi | 524/115 |
| 2009/0224433 A1 | * | 9/2009 | Kurihara et al. | 264/402 |

FOREIGN PATENT DOCUMENTS

| | | |
|---|---|---|
| JP | 2000 254930 | 9/2000 |
| JP | 2004 68004 | 3/2004 |
| JP | 2004 161791 | 6/2004 |
| JP | 2007 106881 | 4/2007 |
| JP | 2007 216447 | 8/2007 |

OTHER PUBLICATIONS

U.S. Appl. No. 13/019,750, filed Feb. 2, 2011, Kurihara, et al.
International Search Report issued Apr. 28, 2009 in PCT/JP09/56263 filed Mar. 27, 2009.
U.S. Appl. No. 13/125,351, filed Apr. 21, 2011, Kurihara, et al.

* cited by examiner

*Primary Examiner* — Peter Szekely
(74) *Attorney, Agent, or Firm* — Oblon, Spivak, McClelland, Maier & Neustadt, L.L.P.

(57) ABSTRACT

A process for producing a thermoplastic resin molded product, comprising: a placement step of placing a thermoplastic resin particle composition 6A into a cavity 22 of a rubber die 2 made of a rubber material; a particle heating step of irradiating the thermoplastic resin particle composition 6A in the cavity 22 with electromagnetic waves having wavelengths ranging from 0.78 to 2 μm through the rubber die 2, thereby heating to melt the thermoplastic resin particle composition 6A; a filling step of filling a thermoplastic resin 6 in a molten state into a space 220 left in the cavity 22; and a cooling step of cooling a thermoplastic resin 6 in the cavity 22 thereby obtaining a thermoplastic resin molded product.

20 Claims, 10 Drawing Sheets

US 8,202,459 B2

PROCESS FOR PRODUCING THERMOPLASTIC RESIN MOLDED PRODUCT AND THERMOPLASTIC RESIN PARTICLE COMPOSITION

CROSS REFERENCE TO RELATED APPLICATION

This application is a 371 of PCT/JP09/056,263, filed on Mar. 27, 2009, and claims priority to the following Japanese Patent Applications: 2008-091688, filed on Mar. 31, 2008; 2009-016816, filed on Jan. 28, 2009; and 2009-016817, filed on Jan. 28, 2009.

TECHNICAL FIELD

The present invention relates to a process for producing a thermoplastic resin molded product, including filling a thermoplastic resin particle composition into a cavity of a rubber die to obtain the thermoplastic resin molded product, and a thermoplastic resin particle composition.

BACKGROUND ART

Resin molded products in specific shapes are made from thermoplastic resins by various common processes, such as injection molding, blow molding, extrusion molding, and press molding.

Patent Document 1 discloses a process for obtaining a resin molded product made of a thermoplastic resin by vacuum cast molding using a rubber mold, wherein the thermoplastic resin is selectively heated in preference to the mold. In the resin molding process, when the thermoplastic resin in a molten state is filled into the cavity of the mold, the thermoplastic resin is irradiated with electromagnetic waves having wavelengths ranging from 0.78 to 2 μm through the mold, whereby the thermoplastic resin is more strongly heated than the rubber mold, based on the difference of the physical properties of the rubber composing the mold and the thermoplastic resin.

However, when a thermoplastic resin is molded using a rubber mold, additional means may be necessary for improving the properties such as shape and surface accuracy of the resin molded product. In particular, when the resin molded product to be molded is large or thin-walled, or the thermoplastic resin material used for molding has a high viscosity, mold cavity filling may be so difficult that it requires additional means for improving the above-described properties.

Alternatively, for example, Patent Document 2 discloses a powder slush molding process, including attaching a powder slush material in a powdery state to the faces of a die and melting it to an intended thickness, and then cooling the material thereby molding a resin molded product adhered to the die. However, Patent Document 2 includes no description about the problem to be solved by the present invention, or the difficulty in increasing the filling pressure of a thermoplastic resin filled into a rubber mold, and thus includes no means for improving the above-described properties.

Patent Document 1: Japanese Unexamined Patent Application Publication No. 2007-216447
Patent Document 2: Japanese Unexamined Patent Application Publication No. 2000-254930

DISCLOSURE OF INVENTION

Problems to be Solved by the Invention

In view of the above problems, the present invention is intended to provide a process for producing a thermoplastic resin molded product which effectively improves the properties, such as shape and surface accuracy, of a thermoplastic resin molded product made from a thermoplastic resin using a rubber die, and a thermoplastic resin particle composition.

Means for Solving the Problems

A first aspect of the present invention is a process for producing a thermoplastic resin molded product, including: a placement step of placing a thermoplastic resin particle composition into a cavity of a rubber die made of a rubber material; a particle heating step of irradiating the thermoplastic resin particle composition in the cavity with electromagnetic waves having wavelengths ranging from 0.78 to 2 μm through the rubber die, thereby heating to melt the thermoplastic resin particle composition; and a cooling step of cooling a thermoplastic resin in the cavity thereby obtaining a thermoplastic resin molded product.

In the process of the present invention for producing a thermoplastic resin molded product, a thermoplastic resin particle composition is used for the molding of a thermoplastic resin molded product by filling a thermoplastic resin into a rubber die.

Specifically, firstly, as the placement step, a thermoplastic resin particle composition is placed in the cavity of the rubber die. At that time, the thermoplastic resin particle composition may be filled into almost whole or part of the cavity.

Subsequently, as the particle heating step, the thermoplastic resin particle composition in the cavity is irradiated with electromagnetic waves having wavelengths ranging from 0.78 to 2 μm through a rubber die. At that time, the thermoplastic resin particle composition is selectively heated (the thermoplastic resin particle composition is more strongly heated) in preference to the rubber die, based on the difference of the physical properties of the rubber material composing the rubber die and the thermoplastic resin particle composition in a powdery state. As a result of this, the thermoplastic resin particle composition is melted with the temperature rise of the rubber die suppressed.

In addition, the thermoplastic resin is filled into the whole of the cavity without increasing the filling pressure so high, whereby the deformation and opening of the rubber die are effectively prevented. Therefore, resin leakage at the carting surface in the rubber die is prevented, and the thermoplastic resin molded product obtained through the cooling step has effectively improved properties such as shape and surface accuracy.

Therefore, according to the above-mentioned process for producing a thermoplastic resin molded product, when a thermoplastic resin is molded using a rubber die, the thermoplastic resin molded product has effectively improved properties such as shape and surface accuracy. In addition, the present invention is markedly effective when the thermoplastic resin molded product to be molded is large or thin-wailed, or when the thermoplastic resin used for molding has a high viscosity.

A second aspect of the present invention is a thermoplastic resin molded product obtained by the process of the first aspect for producing a thermoplastic resin molded product.

The thermoplastic resin molded product of the present invention is produced (molded) using the thermoplastic resin particle composition of the first invention.

Therefore, the thermoplastic resin molded product of the present invention has effectively improved properties such as shape and surface accuracy.

A third aspect of the present invention is a thermoplastic resin particle composition to be filled into a cavity of a rubber die made of a rubber material, and heated to be melted by irradiation with electromagnetic waves having wavelengths ranging from 0.78 to 2 μm through the rubber die, the thermoplastic resin particle composition having a bulk density of 0.4 g/cm$^3$ or more.

The thermoplastic resin particle composition of the present invention prevents development of a defect such as burning caused by excessive rate of heating by the electromagnetic waves having wavelengths ranging from 0.78 to 2 μm.

Therefore, the thermoplastic resin particle composition of the present invention gives a thermoplastic resin molded product having good properties such as shape and surface accuracy.

When the thermoplastic resin particle composition has a small particle size, the bulk density likely decreases. If the particle size of the thermoplastic resin particle composition is so small that the bulk density falls short of 0.4 g/cm$^3$, a defect such as burning may develop.

The thermoplastic resin particle composition may have almost uniform particle sizes, or may be a mixture of particles having different average particle sizes or of different particle size classes.

The thermoplastic resin particle composition is preferably composed of almost spherical particles thereby increasing the bulk density.

The bulk density of the thermoplastic resin particle composition is likely inversely proportional to the temperature rise rate of the thermoplastic resin irradiated with the electromagnetic wave. It is likely that the smaller the bulk density, the higher the temperature rise rate, and the higher the bulk density is, the smaller the temperature rise rate is. Therefore, if the bulk density is less than 0.4 g/cm$^3$, the temperature rise rate is so high that the thermoplastic resin particle composition may develop a defect such as burning. Specifically, the thermoplastic resin particle composition may be burned at the side irradiated with the electromagnetic wave. On the other hand, if the temperature rise rate is so low, the time of irradiation with the electromagnetic waves must be prolonged, which may be result in a defect such as burning in the rubber die. Therefore, the bulk density of the thermoplastic resin particle composition may be 0.8 g/cm$^3$ or less.

A fourth aspect of the present invention is a thermoplastic resin particle composition to be filled into a cavity of a rubber die made of a rubber material, and heated to be melted by irradiation with electromagnetic waves having wavelengths ranging from 0.78 to 2 μm through the rubber die, the thermoplastic resin particle composition being composed of 0.1 to 20% by mass of small thermoplastic resin particles having a particle size of 1 to 100 μm, the balance being large thermoplastic resin particles larger than the small thermoplastic resin particles.

The thermoplastic resin particle composition of the present invention is highly useful in producing a thermoplastic resin molded product formed by electromagnetic wave irradiation through a rubber die.

Specifically, the thermoplastic resin particle composition of the present invention is composed of small thermoplastic resin particles having a particle size of 1 to 100 μm, and large thermoplastic resin particles larger than the small particles. As a result of this, when the thermoplastic resin particles are filled into the cavity of a rubber die, the small thermoplastic resin particles adhere to the inner wall surface of the cavity, and the large thermoplastic resin particles pass on the inner side of the small thermoplastic resin particles in the cavity. Therefore, the thermoplastic resin particles are smoothly filled into the cavity.

The rubber die of the present invention is made of a rubber material, and the small thermoplastic resin particles have a particle size in a range from 1 to 100 μm. As a result of this, the particles adhere to the inner wall surface of the cavity made of a rubber material.

The proportions of the small and large thermoplastic resin particles is 0.1 to 20% by mass and 80 to 99.9%, by mass, respectively. The proportion of the large thermoplastic resin particles is so large that development of a defect such as burning in the thermoplastic resin particle composition is prevented during heating to melt the thermoplastic resin particle composition by irradiation with the electromagnetic waves through a rubber die.

In addition, the thermoplastic resin particle composition filled into the cavity is heated to be melted by irradiation with the electromagnetic waves through a rubber die, and then the thermoplastic resin in the cavity is cooled to obtain a thermoplastic resin molded product. After the thermoplastic resin particle composition is heated to be melted in the cavity, as necessary, a thermoplastic resin in a molten state may be filled (replenished) into the space left in the cavity after the heating and melting.

Therefore, the thermoplastic resin particle composition of the present invention used for molding by electromagnetic wave irradiation allows smooth filling of the thermoplastic resin particles into the cavity, and prevents development of a defect such as burning, thereby producing a thermoplastic resin molded product having good properties such as appearance, shape, and surface accuracy, and high mechanical strength. The present invention is markedly effective when the thermoplastic resin molded product to be molded is large or thin-walled, or when the thermoplastic resin particles used for molding has a high viscosity.

If the small thermoplastic resin particles has a particle size of less than 1 μm, its production is difficult, and they are hard to handle during molding of the thermoplastic resin molded product. On the other hand, if the particle size of the small thermoplastic resin particles is more than 100 μm, adhesion of the small thermoplastic resin particles to the inner wall surface of the cavity is difficult.

If the proportion of the small thermoplastic resin particles is less than 0.1% by mass, the amount of the small thermoplastic resin particles to be adhered to the inner wall surface of the cavity is so small that the passage of the large thermoplastic resin particles on the inner side of the small thermoplastic resin particles in the cavity is difficult. On the other hand, if the proportion of the small thermoplastic resin particles is more than 20% by mass, during heating to melt the thermoplastic resin particle composition, the small thermoplastic resin particles adhered to the inner wall surface of the cavity may develop a defect such as burning.

The particle size of the small thermoplastic resin particles is more preferably from 3 to 90 μm. The particle size of the large thermoplastic resin particles may be, for example, from 200 to 3000 μm. The particle size of the large thermoplastic resin particles is more preferably from 300 to 2000 μm, and even more preferably from 350 to 1500 μm.

The proportion of the small thermoplastic resin particles in the thermoplastic resin particle composition is preferably 10% by mass or less, and more preferably 7% by mass or less.

The melt flow rate of the thermoplastic resin contained in the small and large thermoplastic resin particles (220° C., 10 kg load) is preferably from 1 to 100 g/10 min, more preferably from 5 to 80 g/10 min, and even more preferably from 15 to 65 g/10 min.

The large and small thermoplastic resin particles may be composed of identical thermoplastic resins having the same constitution. Alternatively, the large and small thermoplastic resin particles may be composed of different thermoplastic resins having different constitutions. In this case, the thermoplastic resins are preferably highly compatible with each other, thereby increasing the mechanical strength.

A fifth aspect of the present invention is a thermoplastic resin particle composition to be filled into the cavity of a rubber die made of a rubber material, and heated to be melted by irradiation with electromagnetic waves having wavelengths ranging from 0.78 to 2 μm through the rubber die, the thermoplastic resin particle composition containing thermoplastic resin particles and fine particles at least one of an inorganic powder and a lubricant, the thermoplastic resin particles having a number average particle size of 200 to 3000 μm, the fine particles having a volume average particle size of 0.5 to 50 μm, and the content of the fine particles being from 0.1 to 10 parts by mass with reference to 100 parts by mass of the thermoplastic resin particles.

The thermoplastic resin particle composition of the present invention is highly useful in producing a thermoplastic resin molded product formed by electromagnetic wave irradiation through a rubber die.

Specifically, the thermoplastic resin particle composition of the present invention contains thermoplastic resin particles having a number average particle size of 200 to 3000 μm and fine particles (at least one of an inorganic powder and a lubricant) having a volume average particle size of 0.5 to 50 μm. As a result of this, when the thermoplastic resin particles are filled into the cavity of a rubber die, the fine particles adhere to the inner wall surface of the cavity, and the thermoplastic resin particles pass on the inner side of the fine particles in the cavity. On that account, the thermoplastic resin particles are smoothly filled into the cavity.

The rubber die of the present invention is made of a rubber material, and the fine particles has a volume average particle size of 0.5 to 50 μm, thereby allowing adhesion of the fine particles to the inner wall surface of the cavity made of a rubber material.

The proportion of the thermoplastic resin particles to the fine particles is 100 parts by mass to 0.1 to 10 parts by mass. As a result of this, the proportion of the thermoplastic resin particles is so high that the thermoplastic resin particle composition will not develop a defect such as burning during heating and melting by irradiation with electromagnetic waves through a rubber die.

The thermoplastic resin particle composition filled into the cavity is heated to be melted by irradiation with the electromagnetic waves through the rubber die, and then the thermoplastic resin in the cavity is cooled to obtain a thermoplastic resin molded product. After the thermoplastic resin particle composition is heated to be melted in the cavity, as necessary, a thermoplastic resin in a molten state may be filled (replenished) into the space left in the cavity after thermal and melting.

Therefore, the thermoplastic resin particle composition of the present invention used for molding by electromagnetic wave irradiation allows smooth filling of the thermoplastic resin particles into the cavity, and prevents development of a defect such as burning, thereby producing a thermoplastic resin molded product having good properties such as appearance, shape, and surface accuracy, and high mechanical strength. The present invention is markedly effective when the thermoplastic resin molded product to be molded is large or thin-walled, or when the thermoplastic resin particles used for molding has a high viscosity.

The volume average particle size of the fine particles refers to the median particle size of the volume-weighted particle size, or 50% average particle size ("$D_{50}$") measured by laser diffractometry or other method.

The content of the fine particles is more preferably from 0.2 to 8 parts by mass, and even more preferably from 0.5 to 5 parts by mass with reference to 100 parts by mass of the thermoplastic resin particles. The content of the fine particles is even more preferably 3 parts by mass or less.

When the fine particles is composed solely of the inorganic powder, the amount of the inorganic powder is more preferably from 0.2 to 8 parts by mass, and even more preferably from 0.5 to 5 parts by mass with reference to 100 parts by mass of the thermoplastic resin particles. When the fine particles is composed solely of the lubricant, the amount of the lubricant is more preferably from 0.2 to 8 parts by mass, and even more preferably from 0.5 to 5 parts by mass with reference to 100 parts by mass of the thermoplastic resin particles.

A sixth aspect of the present invention is a thermoplastic resin particle composition to be filled into the cavity of a rubber die made of a rubber material, and heated to be melted by irradiation with electromagnetic waves having wavelengths ranging from 0.78 to 2 μm through the rubber die, the thermoplastic resin particle composition containing 0.0005 to 0.1 parts by mass of an infrared ray absorbing agent with reference to 100 parts by mass of the thermoplastic resin particles.

The thermoplastic resin composition of the present invention is highly useful in molding by electromagnetic wave irradiation (molding of a thermoplastic resin by irradiation with electromagnetic waves through a rubber die).

Specifically, the thermoplastic resin composition of the present invention contains 0.0005 to 0.1 parts by mass of an infrared ray absorbing agent with reference to 100 parts by mass the thermoplastic resin. When the thermoplastic resin composition is filled into the cavity of the rubber die, and the thermoplastic resin composition is irradiated with electromagnetic waves having wavelengths ranging from 0.78 to 2 μm through a rubber die, the infrared ray absorbing agent effectively absorbs the electromagnetic wave.

As a result of this, even if the thermoplastic resin is transparent or has a white or any other color, the thermoplastic resin composition effectively absorbs the electromagnetic waves to be heated and melted quickly. To addition, the rubber die used for molding is readily made, which allows low-cost production of the thermoplastic resin molded products of various shapes.

Therefore, the thermoplastic resin particle composition of the present invention offers a thermoplastic resin molded product having good properties such as shape and surface accuracy.

The amount of the infrared ray absorbing agent is preferably from 0.001 to 0.08 parts by weight, and even more preferably from 0.005 to 0.06 parts by weight with reference to 100 parts by mass of the thermoplastic resin. When the amount is 0.0005 parts by weight or more, the time necessary for heating to melt the thermoplastic resin composition by irradiation with electromagnetic waves is further reduced. The infrared ray absorbing agent may be used alone or in combination of two or more kinds thereof.

The use of the infrared ray absorbing agent facilitates the molding of a thermoplastic resin molded product having a haze value of 20% or less.

The haze value is determined by measuring a test piece having a thickness of 2.5 mm in accordance with JIS K7136. The smaller the haze value is, the higher transparency is. When the thermoplastic resin composition is formed into a thermoplastic resin molded product, the haze value is preferably 15% or less, even more preferably 10% or less, and particularly preferably 8% or less. The haze value can be minimized to almost 0% by reducing the amount of the infrared ray absorbing agent.

The use of the infrared ray absorbing agent facilitates the molding of a thermoplastic resin molded product having a whiteness value of 30% or more.

The whiteness value W(%) is calculated by the formula:

$$W(\%)=100-\{(100-L)^2+a^2+b^2\}^{1/2}$$

wherein L represents brightness, a represents redness, b represents yellowness measured using a bunter color-difference meter. The higher the whiteness value is, the closer to white the resin is.

When the thermoplastic resin composition is formed into a thermoplastic resin molded product, the whiteness value is preferably 40% or more, even more preferably 50% or more, and particularly preferably 70% or more. The whiteness value can be maximized to almost 100%.

The whiteness value may be adjusted by appropriately selecting the type and content of the thermoplastic resin, infrared ray absorbing agent, and coloring agent.

If the content of the infrared ray absorbing agent is less than 0.0005 parts by mass with reference to 100 parts by mass of the thermoplastic resin, the amount of the infrared ray absorbing agent is so small that the thermoplastic resin composition cannot sufficiently absorb electromagnetic waves. On the other hand, if the content of the infrared ray absorbing agent is mere than 0.1 parts by mass with reference to 100 parts by mass of the thermoplastic resin, the excessive amount of the infrared ray absorbing agent makes it difficult to keep a whiteness value of the thermoplastic resin molded product at 30% or more.

BEST MODE FOR CARRYING OUT THE INVENTION

Figure 1:
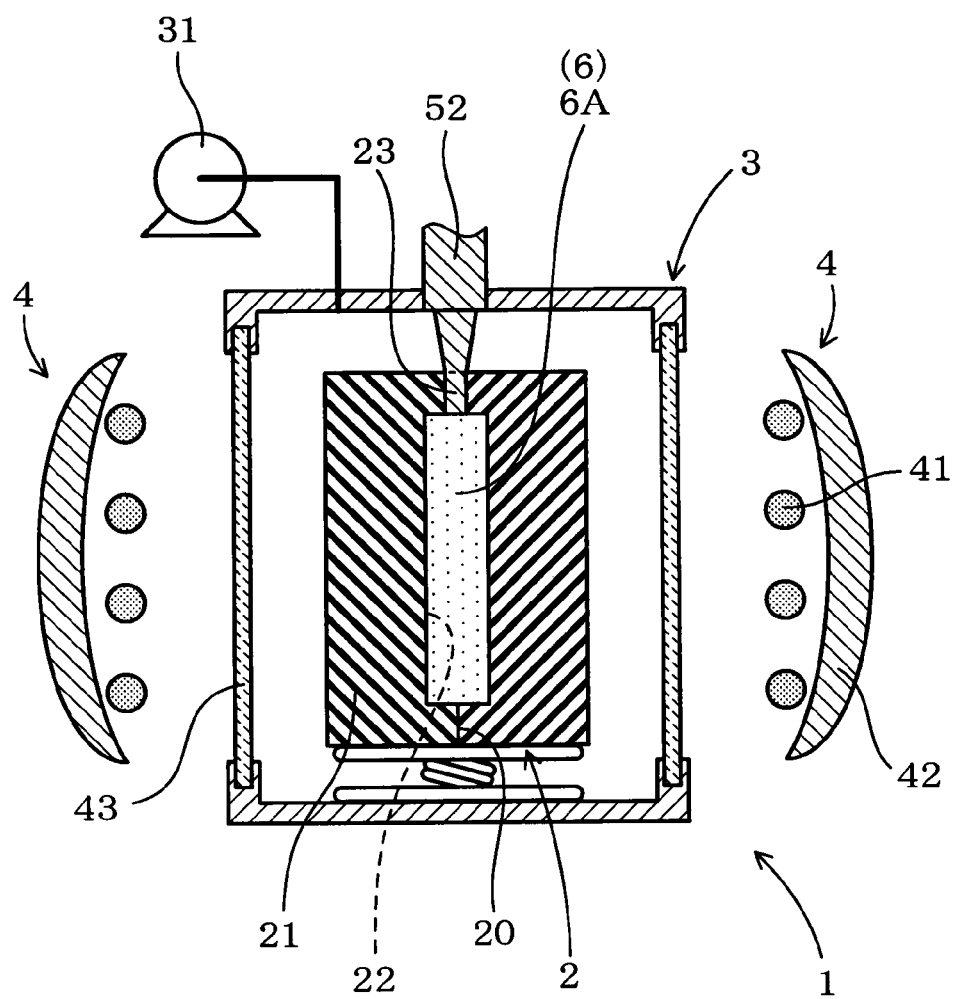
FIG. 1 is an illustration of the state after the placement step of the process for producing a thermoplastic resin molded product in Example 1.

Preferred embodiments of the present invention are described below.

In the first to sixth aspects of the present invention, the thermoplastic resin particle composition refers to a wide range of particles ranging from, for example, fine particles (powder) having an average particle size of several hundreds of micrometers to particles having an average particle size of several millimeters.

The reason why the electromagnetic waves having wavelengths ranging from 0.78 to 2 μm selectively heat the thermoplastic resin in preference to the rubber die is considered as follows.

The electromagnetic waves having wavelengths ranging from 0.78 to 2 μm irradiated to the surface of the rubber die likely transmits the rubber die and are adsorbed into the thermoplastic resin, rather than being absorbed into the rubber die. Therefore, the optical energy of the electromagnetic waves having wavelengths ranging from 0.78 to 2 μm are likely preferentially absorbed into the thermoplastic resin to selectively heat the thermoplastic resin.

The electromagnetic waves irradiated to the thermoplastic resin through the rubber die may include waves having wavelengths outside the range from 0.78 to 2 μm. In the electromagnetic waves or the transmitted electromagnetic waves irradiated to the thermoplastic resin through a rubber die, the proportion of the electromagnetic waves having wavelengths ranging from 0.78 to 2 μm is preferably higher than that of the waves having wavelengths outside the range.

The reason why the electromagnetic waves having wavelengths ranging from 0.78 to 2 μm is used for heating the thermoplastic resin is that the electromagnetic waves in the wavelength range readily transmit through the rubber die, and are readily absorbed into the thermoplastic resin.

The electromagnetic waves preferably have a peak intensity in the wavelength range from 0.78 to 2 μm. In this case, the electromagnetic wave generation source such as an electromagnetic wave generation means may be a halogen heater or infrared lamp which emits electromagnetic waves having wavelengths with specific distribution characteristics.

The rubber die may be made from transparent or translucent silicone rubber as a rubber material. The hardness of the silicone rubber may be from 25 to 80 as measured according to the JIS-A standard.

The thermoplastic resin particles (including the large and small thermoplastic resin particles) may be produced by any method such as mechanical grinding (room temperature or cold grinding, wet grinding, jet grinding), spraying (dry spraying, spray solidification), forced emulsification (melt emulsification, solution emulsification), suspension polymerization, or emulsion polymerization.

For example, the thermoplastic resin particles may be those produced by cold grinding of thermoplastic resin pellets obtained with an extruder. The cold grinding process produces thermoplastic resin particles of various particle sizes. The thermoplastic resin particles may be produced by a so-called under water cut system using an extruder equipped at the tip thereof a die having a small diameter. In the under water cut system, particles (thermoplastic resin particles) of about 0.5 mm are readily produced at a low cost.

The thermoplastic resin particles may be subjected to, as necessary, classification or screening.

The thermoplastic resin used in the thermoplastic resin particle composition may be selected from those absorbing electromagnetic waves having wavelengths ranging from 0.78 to 2 µm, thereby accelerating heating.

The thermoplastic resin used in the thermoplastic resin particle composition is not particularly specified as long as it contains a thermoplastic polymer, and examples thereof include rubber-reinforced styrene resins such as ABS resins (acrylonitrile-butadiene-styrene resins), ASA resins (acrylate-styrene-acrylonitrile resins), AES resins (acrylonitrile-ethylene-propylene-diene-styrene resins); styrene resins such as polystyrene, styrene-acrylonitrile copolymers, styrene-maleic anhydride copolymers, and (meth)acrylate ester-styrene copolymers; olefin resins such as polyethylene and polypropylene; acrylic resins, polycarbonate resins, polyester resins, polyamide resins, vinyl chloride resins, polyarylate resins, polyacetal resins, polyphenylene ether resins, polyphenylene sulfide resins, fluorocarbon resins, imide resins, ketone resins, sulfone resins, urethane resins, polyvinyl acetates, polyethylene oxides, polyvinyl alcohols, polyvinyl ethers, polyvinyl butyrals, phenoxy resins, photosensitive resins, liquid crystalline polymers, and biodegradable plastics. They may be used alone or in combination of two or more thereof.

Among the above thermoplastic resins, those preferred for the molding of the molded product include rubber-reinforced styrene resins, olefin resins, acrylic resins, polyester resins, polyamide resins, alloys of polyester resins and polycarbonate resins, alloys of rubber-reinforced styrene resins and polycarbonate resins, and alloys of rubber-reinforced styrene resins and polyester resins.

The thermoplastic resin particle composition is preferably a rubber-reinforced styrene resin.

In this case, the thermoplastic resin molded product has more markedly improved properties such as shape and surface accuracy.

The rubber-reinforced styrene resin may be a rubber-reinforced styrene resin (A1) obtained by polymerizing a vinyl monomer (a2) composed of a aromatic monovinyl compound in the presence of a rubbery polymer (a1), or a mixture of the rubber-reinforced styrene resin (A1) and a (co)polymer (A2) composed of structural units derived from a vinyl monomer.

The rubbery polymer (a1) may be a homopolymer or copolymer as long as it is rubbery at room, temperature, and is preferably a diene polymer (diene rubbery polymer) or a non-diene polymer (non-diene rubbery polymer). The rubbery polymer (a1) may be a crosslinked or non-crosslinked polymer. They may be used alone or in combination of two or more thereof.

Examples of the diene polymer include homopolymers such as polybutadiene, polyisoprene, and polychloroprene; styrene-butadiene copolymer rubbers such as styrene-butadiene copolymers, styrene-butadiene-styrene copolymers, acrylonitrile-butadiene copolymers, and acrylonitrile-styrene-butadiene copolymers; styrene-isoprene copolymer rubbers such as styrene-isoprene copolymers, styrene-isoprene-styrene copolymers, and acrylonitrile-styrene-isoprene copolymers; and natural rubbers. These copolymers may be block or random copolymers. These copolymers may be hydrogenated at a degree of hydrogenation of less than 50%. The diene polymer may be used alone or in combination of two or more thereof.

Examples of the non-diene polymer include ethylene-α-olefin copolymer rubbers containing ethylene units and α-olefin units having 3 or more carbon atoms, urethane rubbers, acrylic rubbers, silicone rubbers, silicon-acryl IPN rubbers, and polymers prepared by hydrogenation of (co)polymers containing units composed of a conjugated diene compound. These copolymers may be block copolymers or random copolymers. These copolymers may be hydrogenated at a degree of hydrogenation of 50% or more. The non-diene polymer may be used alone or in combination of two or more thereof.

When the rubbery polymer (a1) is a diene polymer, the resin containing the resultant rubber-reinforced styrene resin (A1) is generally referred to as "ABS resin". When the rubbery polymer (a1) is composed at least one of an ethylene-α-olefin and an ethylene-α-olefin-nonconjugated diene copolymer, the resin containing the resultant rubber-reinforced styrene rosin (A1) is generally referred to as "AES resin". When the rubbery polymer (a1) is an acrylic rubber, the resin containing the resultant rubber-reinforced styrene resin (A1) is generally referred to as "ASA resin".

The vinyl monomer (a2) used for the formation of the rubber-reinforced styrene resin (A1) may be composed solely of an aromatic vinyl compound, or a mixture of the aromatic vinyl compound with one or more compounds copolymerizable with the aromatic vinyl compound, such as vinylcyanide compounds, (meth)acrylate ester compounds, maleimide compounds, or acid anhydrides.

Accordingly, the vinyl monomer (a2) may be composed of one or more aromatic vinyl compounds, or a monomer composed of one or more aromatic vinyl compounds and one or more compounds copolymerizable with the aromatic vinyl compounds.

The aromatic vinyl compound is not particularly specified as long as it contains at least one vinyl bond and at least one aromatic ring. Examples of the aromatic vinyl compound include styrene, α-methylstyrene, o-methylstyrene, p-methylstyrene, vinyltoluene, β-methylstyrene, ethyl styrene, p-tert-butyl styrene, vinyl xylene, vinylnaphthalene, monochlorostyrene, dichlorostyrene, monobromostyrene, dibromostyrene, and fluorostyrene. They may be used alone or in combination of two or more thereof. Among them, styrene and α-methylstyrene are preferred.

Examples of the vinylcyanide compound include acrylonitrile and methacrylonitrile. Among them, acrylonitrile is preferred. They may be used alone or in combination of two or more thereof.

Examples of the (meth)acrylate ester compound include methyl methacrylate, ethyl methacrylate, n-propyl methacrylate, isopropyl methacrylate, n-butyl methacrylate, isobutyl methacrylate, tert-butyl methacrylate, methyl acrylate, ethyl acrylate, n-propyl acrylate, isopropyl acrylate, n-butyl acrylate, isobutyl acrylate, and tert-butyl acrylate. They may be used alone or in combination of two or more thereof.

Examples of the maleimide compound include maleimide, N-methylmaleimide, N-butyl maleimide, N-phenyl maleimide, N-(2-methylphenyl)maleimide, N-(4-hydroxyphenyl) maleimide, and N-cyclohexyl maleimide. They may be used alone or in combination of two or more thereof. The introduction of the units of a maleimide compound may be achieved by, for example, copolymerizing a maleic anhydride, and then imidizing the copolymer.

Examples of the acid anhydride include maleic anhydride, itaconic acid anhydride, and citraconic acid anhydride. They may be used alone or in combination of two or more thereof.

In addition to the above compounds, as necessary, vinyl compounds having a functional group such as a hydroxyl group, an amino group, an epoxy group, an amide group, a carboxyl group, or an oxazoline group, may be used. Examples of the vinyl compounds include, 2-hydroxyethyl methacrylate, 2-hydroxyethyl acrylate, hydroxystyrene, N,N-dimethylaminomethyl methacrylate, N,N-dimethylaminomethyl acrylate, N,N-diethyl-p-amino methylstyrene, glycidyl methacrylate, glycidyl acrylate, 3,4-oxycyclohexyl methacrylate, 3,4-oxy cyclohexyl acrylate, vinyl glycidyl ether, glycidyl ether metharylate, allyl glycidyl ether, methacrylamide, acrylamide, methacrylic acid, acrylic acid, and vinyl oxazoline. They may be used alone or in combination of two or more thereof.

As described above, when the thermoplastic resin is a rubber-reinforced styrene resin, the rubber-reinforced styrene resin may be composed solely of the rubber-reinforced styrene resin (A1), or a mixture of the rubber-reinforced styrene resin (A1) and the (co)polymer (A2) obtained by polymerization of vinyl monomers. The vinyl monomers may be at least one compound selected from the compounds used for the formation of the rubber-reinforced styrene resin (A1), that is, aromatic vinyl compounds, vinylcyanide compounds, (meth) acrylate ester compounds, maleimide compounds, acid anhydrides, and compounds having a functional group. Accordingly, the (co)polymer (A2) may be obtained by polymerization of components having the same constitution with the vinyl monomer (a2) used for the formation of the rubber-reinforced styrene resin (A1), monomers of the same type having different constitutions, or monomers of different types having different constitutions. Two or more of these polymers may be contained.

The graft rate of the rubber-reinforced styrene resin (A1) is preferably from 30 to 150% by mass, and more preferably from 50 to 120% by mass. If the graft rate of the rubber-reinforced styrene resin (A1) is too small, the thermoplastic resin molded product may have insufficient surface appearance and impact resistance. If the graft rate is too high, molding processability deteriorates.

The graft rate is calculated by the formula:

$$\text{graft rate}(\% \text{ by mass}) = \{(y-x)/x\} \times 100$$

wherein x is the gram of the rubber component in 1 gram of the rubber-reinforced styrene resin (A1), and y is the gram of the insoluble component left after dissolving 1 g of the rubber-reinforced styrene resin (A1) in acetone (or acetonitrile when the rubbery polymer (a1) is an acrylic rubber).

The limiting viscosity $[\eta]$ (measured in methyl ethyl ketone at 30° C.) of the soluble component of the rubber-reinforced styrene resin (A1) in acetone (or acetonitrile when the rubbery polymer (a1) is an acrylic rubber) is preferably from 0.2 to 1 dl/g, and more preferably from 0.3 to 0.8 dl/g. When the limiting viscosity is within the range, the thermoplastic resin molded product offers good molding processability and the molded product has good impact resistance.

The graft rate and limiting viscosity $[\eta]$ are readily controlled by changing the type and amount of the polymerization initiator, chain transferring agent, emulsifier, and solvent, and the time and temperature of polymerization in the production of the rubber-reinforced styrene resin (A1).

Examples of the (co)polymer (A2) include the following (1) to (6). The respective monomers may be the compounds used for the formation of the rubber-reinforced styrene resin (A1), and preferred examples of the compound are the same: (1) one or more (co)polymers obtained by polymerization of an aromatic vinyl compound alone; (2) one or more (co)polymers obtained by polymerization of a (meth) acrylate ester compound alone; (3) one or more copolymers obtained by polymerization of an aromatic vinyl compound and a vinylcyanide compound; (4) one or more copolymers obtained by polymerization of an aromatic vinyl compound and a (meth) acrylate ester compound; (5) one or more copolymers obtained by polymerization of an aromatic vinyl compound, vinylcyanide compound, and other compound; (6) one or more copolymers obtained by polymerization of an aromatic vinyl compound and a compound other than a vinylcyanide compound.

They may be used alone or in combination of two or more thereof.

Accordingly, specific examples of the (co)polymer (A2) include acrylonitrile-styrene copolymers, acrylonitrile-α-methylstyrene copolymers, acrylonitrile-styrene-methyl methacrylate copolymers, styrene-methyl methacrylate copolymers, and acrylonitrile-styrene-N-phenyl maleimide copolymers.

The limiting viscosity $[\eta]$ (measured in methyl ethyl ketone at 30° C.) of the (co)polymer (A2) is preferably from 0.2 to 0.8 dl/g. When the limiting viscosity $[\eta]$ is within the range, good physical property balance is attained between molding processability and impact resistance. The limiting viscosity $[\eta]$ of the (co)polymer (A2) is controllable by adjusting the production conditions as in the case of the rubber-reinforced styrene resin (A1).

The limiting viscosity $[\eta]$ (measured in methyl ethyl ketone at 30° C.) of the soluble component of the rubber reinforcement resin in acetone (or acetonitrile when the rubbery polymer (a1) is an acrylic rubber) is preferably from 0.2 to 0.8 dl/g. When the limiting viscosity $[\eta]$ is within the range, good physical property balance is attained between molding processability and impact resistance.

Examples of the styrene resin include polymers obtained by polymerizing an aromatic vinyl compound alone, and copolymers obtained by copolymerizing the aromatic vinyl compound with a compound copolymerizable with the aromatic vinyl compound, which are listed above as the examples of the (co)polymer (A2).

The olefin resin is not particularly specified as long as it is a polymer containing an α-olefin monomer unit having 2 or more carbon atoms. The olefin resin is preferably a polymer containing an α-olefin monomer unit having 2 to 10 carbon atoms. Accordingly, examples of the olefin resin include (co) polymers composed mainly of one or more α-olefin monomer units having 2 to 10 carbon atoms, and copolymers composed of one or more α-olefin monomer units having 2 to 10 carbon atoms and one or more monomer units of a compound copolymerizable with the α-olefin. They may be used alone or in combination of two or more thereof.

Examples of the olefin resin include polyethylene, polypropylene, ethylene-propylene copolymers, polybutene-1, ethylene-butene-1 copolymers. Among them, polyethylene, polypropylene, and propylene-ethylene copolymers are preferred, and more preferred are polymers containing 50% by mass or more of propylene units with reference to the whole monomer units, that is, polypropylene and ethylene-propylene copolymers. The ethylene-propylene copolymers may be random or block copolymers.

The olefin resin may be crystalline or non-crystalline. The olefin resin preferably has a degree of crystallinity of 20% or more as measured by X-ray diffraction at room temperature.

The melting point of the olefin resin is preferably 40° C. or more based on JIS K7121.

The molecular weight of the olefin resin is not particularly specified. From the viewpoint of moldability, the melt flow rate (measured according to JISK7210: 1999, 230° C., load 2.16 kg) of the polypropylene resin is usually from 0.01 to 500 g/10 minutes, more preferably 0.04, even more preferably 0.05 to 100 g/10 minutes, and the melt flow rate (measured according to JISK6922-2, 190° C., load 2.16 kg) of the polyethylene resin is usually from 0.01 to 500 g/10 minutes, and more preferably from 0.05 to 100 g/10 minutes.

The olefin resin may be an ionomer, an ethylene-vinyl acetate copolymer, an ethylene-vinyl alcohol copolymer, a cyclic olefin copolymer, or a chlorinated polyethylene.

The acrylic resin may be obtain by polymerizing a (meth) acrylate ester compound alone, or copolymerizing a (meth) acrylate ester compound with a vinyl monomer copolymerizable with the (meth)acrylate ester compound. Specific examples of the acrylic resin include homopolymers of methyl methacrylate, and copolymers of methyl methacrylate with an alkyl (meth)acrylate ester such as methyl acrylate, ethyl (meth)acrylate, propyl (meth)acrylate, butyl (meth) acrylate, or 2-ethylhexyl (meth)acrylate, or an aromatic vinyl monomer such as styrene, α-methylstyrene, or vinyltoluene. The term "(meth)acrylate ester" refers to an acrylate and/or a methacrylate.

The weight average molecular weight of the acrylic resin is preferably from 50,000 to 400,000 as measured by the CPC method using tetrahydrofuran as the solvent. When the weight average molecular weight is within the range, good molding processability is achieved, and the resultant transparent thermoplastic resin molded product has high impact resistance and toughness.

The acrylic resin may be composed of two or more acrylic resins having different weight average molecular weights, as long as the weight average molecular weight of the whole resin falls within the above range. The acrylic resin may be produced by a known polymerization method such as radical polymerization, charge transfer radical polymerization, anionic polymerization, group transfer polymerization, or coordinated anionic polymerization.

The polycarbonate resin is not particularly specified as long as it contains a carbonate bond in the main chain, and may be an aromatic or aliphatic polycarbonate. These polycarbonates may be used in combination. In the present invention, from the viewpoints of impact resistance and heat resistance, the polycarbonate resin is preferably an aromatic polycarbonate. The ends of the polycarbonate resin may be modified by R—CO— or R'—O—CO— groups (R and R' represent organic groups). The polycarbonate resin may be used alone or in combination of two or more thereof.

The viscosity average molecular weight of the polycarbonate resin is preferably from 12,000 to 40,000, as converted from the solution viscosity measured at 20° C. using methylene chloride as the solvent. When the viscosity-average molecular weight is within the range, good molding processability is achieved, and the molded product has high impact resistance, toughness, and chemical resistance.

The polycarbonate resin may be composed of two or more polycarbonate resins having different viscosity average molecular weights, as long as the viscosity average molecular weight of the whole resin falls within the above range.

As described above, the polycarbonate resin may be used in the form of an alloy in combination with a polyester resin, or a rubber-reinforced resin and a polyester resin.

Examples of the polyester resin include: polymers obtained from (1) a dicarboxylic acid having 2 to 20 carbon atoms and/or its ester derivative and (2) a diol component; polymers obtained from a bifunctional oxycarboxylic acid compound; polymers obtained from a caprolactone compounds; and copolymers composed of (1), (2) and a compound selected from the group consisting of bifunctional oxy carboxylic acid compounds and lactone compounds. The copolymer is preferably composed of (1), (2), and a bifunctional oxycarboxylic acid compound. The number of carbon atoms refers to the total carbon atoms forming the carboxyl group and the chains and rings directly linked to the carboxyl group.

The polyester resin is not particularly specified as long as it contains an ester bond in the main chain of the molecule, and may be a saturated or unsaturated polyester resin. Among them, a saturated polyester resin is preferred. The polyester resin may be a homopolymer or a copolymer polyester, and may be a crystalline or non-crystalline resin.

Examples of the polyester resin include homopolymer polyesters such as polyalkylene terephthalate including polyethylene terephthalate (PET), polypropylene terephthalate (PPT), polybutylene terephthalate (PBT), polyhexamethylene terephthalate, polycyclohexane-1,4-dimethylterephthalate, and polyneopentyl terephthalate, polyethylene isophthalates, and polyalkylene naphthalates such as polyethylene naphtha late, polybutylene naphthalate, and polyhexamethylene naphthalate; copolymer polyesters composed mainly of at least one of an alkylene terephthalate unit and an alkylene naphthalate unit; and liquid crystalline polyesters. Among them, polybutylene terephthalate are preferred. They may be used alone or in combination of two or more thereof.

From the viewpoint of impact resistance, of the above polyester resins, polybutylene terephthalate usually has a solution viscosity of 0.5 to 2.0 in terms of the limiting viscosity [η] (dl/q) measured at 25° C. using O-chlorophenol as the solvent. The limiting viscosity [η] (dl/g) of polyethylene terephthalate is usually from 0.5 to 2.0, and preferably from 0.5 to 1.5, as measured at 25° C. in a mixed solvent containing equal parts of tetrachloromethane and phenol.

The number average molecular weight (Mn) of the aliphatic polyester resin is usually from 10000 to 20000, preferably from 30000 to 200000, and the ratio of the weight average molecular weight (Mw) to the number average molecular weight (Mn), or Mw/Mn is usually 3 or more, and preferably 4 or more.

The polyamide resin is not particularly specified, as long as it has an acid amide bond (—CO—NH—) in the main chain. Specific examples include nylon 4, 6, 7, 8, 11, 12, 6.6, 6.9, 6.10, 6.11, 6.12, 6T, 6/6.6, 6/12, 6/6T, and 6T/6I.

The end of the polyamide resin may be blocked by carboxylic acid or amine. Examples of the carboxylic acid include aliphatic monocarboxylic acids such as caproic acid, caprylic acid, capric acid, lauric acid, myristic acid, palmitic acid, stearic acid, and behenic acid. Examples of the amine include aliphatic primary amines such as hexyl amine, octyl amine, decyl amine, lauryl amine, myristyl amine, palmityl amine, stearyl amine, and behenyl amine.

The polyamide resin may be used alone or in combination of two or more thereof.

The degree of polymerization of the polyamide resin is not particularly specified. From the viewpoint of impact resistance, the relative viscosity is usually from 1.6 to 6.0, and preferably from 2.0 to 5.0. The relative viscosity is measured at 30° C. in a solution prepared by dissolving 2 g of the polymer in 100 ml of formic acid (purity: 90% by mass).

Examples of the vinyl chloride resin include polyvinyl chloride resins, copolymers of vinyl chloride with other vinyl monomer copolymerizable with vinyl chloride, acrylonitrile-butadiene copolymer blends, and chlorinated polyvinyl chloride resins prepared by chlorination of polyvinyl chloride.

Examples of the other vinyl monomer copolymerizable with vinyl chloride include ethylene, propylene, maleate, vinyl acetate, (meth) acrylic acid, and (meth)acrylates. The average degree of polymerization of the vinyl chloride resin is usually from 700 to 1800, and preferably from 1000 to 1500.

In the process for producing a thermoplastic resin molded product according to the first aspect of the present invention, after the particle heating step is carried out, the cooling step is preceded by a filling step of filling the thermoplastic resin in a molten state into the space left in the cavity.

In this case, after the particle heating step, the space left in the cavity after melting the thermoplastic resin particle composition is filled with the thermoplastic resin in a molten state in the filling step. At that time, the portion in the cavity of the rubber die where the thermoplastic resin particle composition has been presented before the particle heating step, the lower part of the cavity of the rubber die in a vertical direction, or the surface of the cavity of the rubber die are filled with the thermoplastic resin obtained by melting the thermoplastic resin particle composition, thereby reducing the amount of the thermoplastic resin in a molten state to be newly filled.

As a result of this, the thermoplastic resin is filled into the whole of the cavity without increasing the filling pressure so high, whereby the deformation and opening of the rubber die are of prevented. Therefore, resin leakage at the parting surface in the rubber die is prevented, and the thermoplastic resin molded product obtained through the cooling step has effectively improved properties such as appearance, shape and surface accuracy, and mechanical strength.

The thermoplastic resin particle composition and the thermoplastic resin in a molten state may have the same constitution.

In this case, when the thermoplastic resin molded product is molded through the cooling step of cooling the thermoplastic resin filled into the cavity, the resultant thermoplastic resin molded product has no interface between the thermoplastic resin particle composition and the thermoplastic resin in a molten state.

The thermoplastic resin particle composition and the thermoplastic resin in a molten state may have intentionally different constitutions and colors. In this case, the thermoplastic resin molded product has effectively improved properties, and serves as a two color molded product.

In the filling step, the thermoplastic resin in a molten state is preferably filled into the cavity left in the space under an injection pressure at 0.5 to 5 MPa.

In this case, when the thermoplastic resin is filled into the cavity under an appropriate injection pressure within the predetermined range, the deformation and opening of the rubber die are effectively prevented, and the thermoplastic resin molded product has improved properties such as shape and surface accuracy. In order to uniformly fill the thermoplastic resin into almost the whole of the cavity of the rubber die, the injection pressure is preferably 0.5 MPa or more. In order to prevent deformation of the rubber die and resin leakage from the cavity of the rubber die, the injection pressure is preferably 5 MPa or less.

At any time, at least during the period before the placement step to before the particle heating step, a vacuum step of vacuuming the cavity or the space left in the cavity is preferably carried out.

In this case, the vacuum step further facilitates the filling of the thermoplastic resin in a molten state into the cavity, and facilitates the formation of a thermoplastic resin molded product with good appearance and no bubble.

The vacuum step may be carried out at any time, at least during the placement step, before or after the placement step, during the particle heating step, before or after the particle heating step, during the filling step, or before or after the filling step.

The vacuum state refers to an absolute vacuum state, and a reduced pressure state with reference to the atmospheric pressure.

In the filling step, it is preferred that the thermoplastic resin in the cavity be heated by irradiation with electromagnetic waves having wavelengths ranging from 0.78 to 2 µm through a rubber die.

In this case, in the filling step, when the thermoplastic resin in a molten state is filled into the cavity, the thermoplastic resin is heated selectively in preference to the rubber die, whereby the viscosity of the thermoplastic resin is kept low. As a result of this, the thermoplastic resin molded product has effectively improved properties such as shape and surface accuracy.

In the particle heating step and filling step, an electromagnetic wave generation means emitting electromagnetic waves having wavelengths ranging from 0.78 to 4 µm, and a filter decreasing the transmission of electromagnetic waves having wavelengths over 2 µm are used. The electromagnetic waves emitted from the electromagnetic wave generation means are transmitted through the filter, and the transmitted electromagnetic waves after passing through the filter are irradiated to the thermoplastic resin in the cavity through the rubber die, thereby heating the thermoplastic resin.

In this case, in the particle heating step and the filling step, electromagnetic waves having wavelengths ranging from 0.78 to 4 µm are emitted from the electromagnetic wave generation means, and the transmitted electromagnetic waves after passing through the filter are irradiated to the thermoplastic resin through the rubber die. The electromagnetic waves emitted from the electromagnetic wave generation means include those having wavelengths over 2 µm, but the filter minimizes the irradiation of the rubber die with the electromagnetic waves having wavelengths over 2 µm. As a result of this, the thermoplastic resin filled into the cavity of the rubber die is effectively irradiated with near-infrared rays (electromagnetic waves) having a wavelength of 2 µm or less. Therefore, the thermoplastic resin is effectively heated by the near-infrared rays having wavelengths of 2 µm or less, without excessive heating of the rubber die.

The filter may be made of glass such as fused silica, or water charged into a container or passage. When the filter is made of water, the water may be circulated or renewed, and the water heated by irradiation with electromagnetic waves may be renewed as necessary, thereby effectively controlling the temperature rise of the filter.

The thermoplastic resin composing the thermoplastic resin particle composition may be a non-crystalline resin.

The cooling rate of the thermoplastic resin in the rubber die made of a rubber material is lower than those in a metal die. Therefore, crystallinity of the thermoplastic resin may increase during cooling, whereby the resin molded product may deteriorate in its dimensional accuracy and impact resistance. The use of a non-crystalline thermoplastic resin prevents the deterioration in the dimensional accuracy and impact resistance of the thermoplastic rosin molded product.

Examples of the non-crystalline resin include the above-described rubber-reinforced styrene resins, styrene resins, acrylic resins, polycarbonate resins, and alloys of rubber-reinforced styrene resins and polycarbonate resins. Among them, rubber-reinforced styrene resins are preferred.

The bulk density of the thermoplastic resin particle composition is preferably 0.4 g/cm$^3$ or more.

In this case, the same effect as the third aspect of the present invention will be achieved.

The thermoplastic resin particle composition may contain 0.1 to 20% by mass of small thermoplastic resin particles having a particle size of 1 to 100 μm, the balance being large thermoplastic resin particles larger than the small thermoplastic resin particles.

In this case, the same effect, as the fourth aspect of the present invention will be achieved.

In the placement step, it is preferred that the small thermoplastic resin particles be placed first in the cavity of the rubber die in an opened or closed state, and then the large thermoplastic resin particles be filled into the cavity of the rubber die.

In this case, in the placement step, the small thermoplastic resin particles effectively adhere to the inner wall of the cavity, and then the large thermoplastic resin particles pass on the inner side of the small thermoplastic resin particles in the cavity. Therefore, the thermoplastic resin particles are smoothly filled into the cavity.

The small thermoplastic resin particles are easily placed by sprinkling them over the surface of the cavity of the rubber die in an open state.

The bulk density of the large thermoplastic resin particles is preferably 0.4 g/cm$^3$ or more.

The maximum particle size of the large thermoplastic resin particles is preferably 0.8 or less times the minimum width of the cavity.

As a result of this, difficulty in charging the large thermoplastic resin particles into the cavity is avoided.

The particle size of the large thermoplastic resin particles is more preferably 0.7 or less times the minimum width of the cavity.

The large and small thermoplastic resin particles may be composed of the above-described thermoplastic resin.

The thermoplastic resin particle composition may include thermoplastic resin particles and fine particles of at least one of an inorganic powder and a lubricant, the number average particle size of the thermoplastic resin particles being from 200 to 3000 μm, the volume average particle size of the fine particles being from 0.5 to 50 μm, and the content of the fine particles being from 0.1 to 10 parts by mass with reference to 100 parts by mass of the thermoplastic resin particles.

In this case, the same effect as the fifth aspect of the present invention will be achieved.

In the placement step, it is preferred that the fine particles be placed first in the cavity of the rubber die in an opened or closed state, and then the thermoplastic resin particles be charged into the cavity of the rubber die.

In this case, in the placement step, the fine particles effectively adhere to the inner wall surface of the cavity, and then the thermoplastic resin particles pass on the inner side of the fine particles in the cavity. Therefore, the thermoplastic resin particles are smoothly filled into the cavity.

The fine particles are easily placed by sprinkling them over the surface of the cavity of the rubber die in an opened state.

The number average particle size of the thermoplastic resin particles is preferably 0.8 or less times the minimum width of the cavity.

As a result of this, difficulty in filling the thermoplastic resin particles into the cavity is avoided.

The number average particle size of the thermoplastic resin particles is more preferably 0.7 or less times the minimum width of the cavity.

Examples of the inorganic powder include talc, calcium carbonate, magnesium carbonate, mica, kaolin, calcium sulfate, barium sulfate, titanium white, white carbon, carbon black, aluminium hydroxide, magnesium hydroxide, glass fibers, glass fiber milled fibers, glass heads, hollow glass, glass flakes, carbon fibers, milled carbon fibers, wollastonite, attapulgite, and whiskers such as silicon carbide whisker, zinc oxide whisker, aluminum borate whisker, potassium titanate whisker, and basic magnesium sulfate whisker. They may be used alone or in combination of two or more thereof. Among them, talc, zinc oxide whisker, and basic magnesium sulfate whisker are preferred.

The inorganic powder is preferably talc.

Talc is a powder produced by pulverization of a mineral referred to as talc, and is composed of hydrous magnesium silicate (4SiO$_2$.3MgO.H$_2$O). Talc is composed mainly of about 60% by mass of SiO$_2$, about 30% by mass of MgO. The talc in the present invention is in the form of fine particles having a volume average particle size of 0.5 to 50 μm. The surface of the talc may be treated with a silane coupling agent or the like.

The volume average particle size (50% average particle size) of the talc is more preferably from 1 to 30 μm, and even more preferably from 3 to 15 μm.

The lubricant may be a known lubricant. Specific examples of the lubricant include compounds having a long-chain alkyl group and a functional group, α-olefin (co)polymers such as ethylene or propylene, silicon-containing polymer such as dimethylpolysiloxane, copolymers of α-olefin and a functional group-containing unsaturated compound, ethylene copolymers, propylene copolymers, ethylene-propylene copolymers, polymers obtained by adding a functional group-containing unsaturated compound to a polymer such as a silicon-containing polymer, and polymers obtained by oxidizing polyethylene, polypropylene, or an ethylene-propylene copolymer, and then adding a carboxyl group or the like.

Examples of the functional group include a carboxyl group or its metal salt, a hydroxyl group, an oxazoline group, an acid anhydride group, an ester group, an amino group, an amide group, an epoxy group, an isocyanate group, an urethane group, and an urea group. Preferred functional groups include a carboxyl group or its divalent metal salt, an ester group, and an amide group. Examples of the salt of a carboxyl group include metal salts such as sodium, potassium, lithium, calcium, magnesium, aluminum, zinc, barium, cadmium, manganese, cobalt, lead, and tin salts. The functional group-containing unsaturated compound may be the above-described functional group-containing unsaturated compound. Preferred are compounds having a long-chain alkyl group and a functional group, and ethylene copolymers.

The volume average particle size (50% average particle size) of the lubricant is more preferably from 1 to 30 μm, and even more preferably from 3 to 15 μm.

The particle size of the thermoplastic resin particles is more preferably from 200 to 2000 μm, and even more preferably from 350 to 1500 μm. The bulk density of the thermoplastic resin particles is preferably 0.4 g/cm$^3$ or more.

The melt flow rate (220° C., 10 kg load) of the thermoplastic resin used in the thermoplastic resin particles is preferably from 1 to 100 g/10 min, more preferably from 5 to 80 g/10 min, and even more preferably from 15 to 65 g/10 min.

The thermoplastic resin particle composition may include 0.0005 to 0.1 parts by mass of an infrared ray absorbing agent with reference to 100 parts by mass of the thermoplastic resin particles.

In this case, the same effect as the sixth aspect of the present invention will be achieved.

The infrared ray absorbing agent may be selected from various ones which absorb electromagnetic waves having near infrared ray wavelengths ranging from 0.78 to 2 μm.

The infrared ray absorbing agent may be inorganic or organic. Examples of the inorganic infrared ray absorbing agent include metal oxides such as tin oxide, zinc oxide, and copper oxide; antimony-doped tin oxide, indium-doped tin oxide, metal complex compounds of zinc oxide containing at least one element selected from the group consisting of In, Ga, Al, and Sb.

Examples of the organic infrared ray absorbing agent include anthraquinone dyes, cyanine dyes, polymethine dyes, azomethine dyes, azo dyes, polyazo dyes, diimonium dyes, aminium dyes, phthalocyanine dyes, naphthalocyanine dyes, indocyanine dyes, naphthoquinone dyes, indole phenol dyes, triallylmethane dyes, metal complex dyes, dithiol nickel complex dyes, azo cobalt complex dyes, and squarylium dyes.

The thermoplastic resin composition may include 0.05 to 30 parts by mass of a coloring agent with reference to 100 parts by mass of the thermoplastic resin.

In this case, the thermoplastic resin molded product to be molded will have a whiteness value of 30% or more and an appropriate color.

The content of the coloring agent is more preferably from 0.1 to 15 parts by mass, and even more preferably from 0.1 to 10 parts by mass with reference to 100 parts by mass of the thermoplastic resin.

The coloring agent may be a dye, an inorganic pigment, or an organic pigment. They may be used in combination. The color of the coloring agent is not particularly specified, and may have a white, red, yellow, blue, or green color.

Examples of the dye include nitroso dyes, nitro dyes, azo dyes, stilbene azo dyes, ketoimine dyes, triphenylmethane dyes, xanthene dyes, acridine dyes, quinoline dyes, methine/polymethine dyes, triazole dyes, indamine/indophenol dyes, azine dyes, oxazine dyes, thiazine dyes, sulfur dyes, aminoketone/oxyketone dyes, anthraquinone dyes, indigold dyes, and phthalocyanine dyes.

Examples of the inorganic pigment include white inorganic pigments, red inorganic pigments, yellow inorganic pigments, green inorganic pigments, and blue inorganic pigments. They may be used alone or in combination of two or more thereof.

Examples of the white inorganic pigment include $TiO_2$, $Al_2O_3.nH_2O$, $[ZnS+BaSO_4]$, $CaSO_4.2H_2O$, $BaSO_4$, $CaCO_3$, and $2PbCO_3.Pb(OH)_2$.

Examples of the red inorganic pigment include $CdS.nCdSe$, $PbCrO_4.mPbMoO_4.nPbSO_4$, $TiO_2.Sb_2O_3.NiO$, Zn—Fe complex oxides (for example, $ZnO.Fe_2O_3$), and Zn—Fe—Cr complex oxides (for example, $ZnO.Fe_2O_3.Cr_2O_3$).

Examples of the yellow inorganic pigment include $TiO_2.BaO.NiO$, $TiO_2.NiO.Sb_2O_3$, $Fe_2O_3.H_2O$, $PbCrO_4$, $Pb(SbO_3)_2$, $Pb_2(SbO_2)_2$, Ti—Sb—Ni complex oxides, and Ti—Sb—Cr complex oxides.

Examples of the green inorganic pigment include $Cu(C_2H_3O_2)_3$, $Cu(AsO_2)_2$, $CoO.nZnO$, $BaMnO_2$, $Cu_2(OH)_2(CO_3)$, and Ti—Co—Ni—Zn complex oxides.

Examples of the blue inorganic pigment include $CoO.nAl_2O_3$, $CoO.nSnO.mMgO$, and $Na_6Al_6(SiO_4)_6.2Na_3SO_4$.

Examples of the organic pigment include azo pigments such as azo lake pigments, benzoimidazol one pigments, diarylide pigments, and condensed azo pigments; phthalocyanine pigments such as phthalocyanine blue and phthalocyanine green; and condensed polycyclic pigments such as isoindolinone pigments, quinophthalone pigments, quinacridone pigments, perylene pigments, anthraquinone pigments, perinone pigments, and dioxazine violet.

When the chromatic coloring agent is a deep coloring agent by itself, its col or may be lightened with a white coloring agent, thereby achieving an intended whiteness.

When a transparent thermoplastic resin molded product having a haze value of 20% or less is molded from a thermoplastic resin containing an infrared ray absorbing agent, the thermoplastic resin used herein may be selected from various transparent (or translucent) thermoplastic resins, as long as the molded product having a thickness of 2.5 mm made from the thermoplastic resin has a haze value of 20% or less as measured according to JIS K7136. Specific examples include: the styrene resins such as AS resins and MS resins; the rubber-reinforced styrene resins such as transparent ABS resins and acrylic resins; the polycarbonate resins and polyester resins such as PET resins, PEN resins, vinyl chloride resins, cycloolefin resins, polymethylpentene resins, and polyarylate resins. Among them, transparent ABS resins, acrylic resins, and polycarbonate resins are preferred for achieving good moldability and impact resistance.

The transparent ABS is preferably a rubber-reinforced vinyl resin obtained by polymerizing monomer components containing 50% by mass or more of a (meth)acrylate ester compound in the presence of a rubbery polymer, or a mixture of the rubber-reinforced vinyl resin and a (co)polymer containing structural units derived from a vinyl monomer.

The (meth) acrylate ester compound used in the transparent ABS resin may be the above-described (meth)acrylate ester compound. Among the examples, methyl acrylates, butyl acrylates, and methyl methacrylates are preferred.

The rubbery polymer used in the transparent ABS resin may be the above-described rubbery polymer (a1). Among the examples, conjugated diene rubbers, olefin rubbers, and acrylic rubbers are preferred. They may be used alone or in combination of two or more thereof.

The graft rate of the transparent ABS resin is preferably from 10 to 100%, more preferably from 15 to 90, and even more preferably from 20 to 70%. If the graft rate is less than 10%, the transparent thermoplastic resin molded product to be obtained may have insufficient appearance or impact strength. On the other hand, it the graft rate is more than 100%, the molding processability may deteriorate.

The limiting viscosity [η] (measured in methyl ethyl ketone at 30° C.) of the methyl ethyl ketone-soluble component, which is the matrix component, of the transparent ABS resin is preferably from 0.1 to 1.0 dl/g, more preferably from 0.2 to 0.9 dl/g, and even more preferably from 0.3 to 0.7 dl/g. When the limiting viscosity [η] is within the above range, a transparent thermoplastic resin molded product having good impact resistance and molding processability (flowability) will be obtained. The graft rate (%) and limiting viscosity [η] are readily controlled by changing the type and amount of the polymerization initiator, chain transferring agent, emulsifier, and solvent, and the time and temperature of polymerization.

The difference of the refractive index between the rubbery polymer (rubber component) of the transparent ABS resin and the matrix resin is preferably 0.05 or less, more preferably 0.02 or less, and even more preferably 0.01 or less. When the difference of the refractive index is within the range, thermoplastic resin molded product having good transparency will be obtained.

When a transparent thermoplastic resin molded product having a whiteness value of 30% or more is molded from a thermoplastic resin containing an infrared ray absorbing agent, the thermoplastic resin may be selected from the above-described thermoplastic resins. Preferred examples include rubber-reinforced styrene resins, olefin resins, acrylic resins, polyester resins, polyamide resins, alloys of polyester resins and polycarbonate resins, alloys of rubber-reinforced styrene resins and polycarbonate resins, and alloys of rubber-reinforced styrene resins and polyester resins.

The thermoplastic resin particle composition may contain any additive according to the intended use. Examples of the additive include fillers, heat stabilizers, antioxidants, ultraviolet light inhibitors, preservatives, antistatic agents, plasticizing agents, lubricants, flame retardants, antibacterial agents, coloring agents, fluorescent brightening agents, luminous pigments, fluorescent dyes, light diffusing agents, crystal nucleating agents, flow improvers, impact modifiers, infrared ray absorbing agents, photochromic agents, photocatalytic antifouling agents, and polymerization initiators.

Examples of the filler include talc, clay, wollastonite, calcium carbonate, glass fiber, glass beads, glass balloon, milled fiber, glass flakes, carbon fibers, carbon flakes, carbon beads, carbon milled fibers, metal flakes, metal fibers, metal-coated glass fibers, metal-coated carbon fibers, metal-coated glass flakes, silica, ceramic particles, ceramic fibers, aramid particles, aramid fibers, polyarylate fibers, graphite, conductive carbon black, and various whiskers. They may be used alone or in combination of two or more thereof.

The content of the filler is usually from 0.1 to 5 parts by mass with reference to 100 parts by mass of the thermoplastic resin particle composition.

Examples of the heat stabilizer include phosphites, hindered phenols, and thioethers. They may be used alone or in combination of two or more thereof.

The content of the heat stabilizer is usually from 0.01 to 2 parts by mass with reference to 100 parts by mass of the thermoplastic resin particle composition.

Examples of the antioxidant include hindered amines, hydroquinones, hindered phenols, and sulfur-containing compounds. They may be used alone or in combination of two or more thereof.

The content of the antioxidant is usually from 0.01 to 2 parts by mass with reference to 100 parts by mass of the thermoplastic resin particle composition.

Examples of the ultraviolet absorber include benzophenones, benzotriazoles, salicylates, and metal complex salts. They may be used alone or in combination of two or more thereof. The ultraviolet absorber may be preferably combined with hindered amines.

The content of the ultraviolet absorber is usually from 0.05 to 2 parts by mass with reference to 100 parts by mass of the thermoplastic resin particle composition.

The content of the preservatives is usually from 0.01 to 2 parts by mass with reference to 100 parts by mass of the thermoplastic resin particle composition.

The content of the antistatic agent is usually from 0.1 to 5 parts by mass with reference to 100 parts by mass of the thermoplastic resin particle composition.

The content of the plasticizing agent is usually from 0.5 to 5 parts by mass with reference to 100 parts by mass of the thermoplastic resin particle composition.

Examples of the lubricant include fatty acid esters, hydrocarbon resins, paraffin, higher fatty acids, oxy-fatty acids, fatty acid amides, alkylene bis-fatty acid amides, aliphatic ketones, fatty acid lower alcohol esters, fatty acid polyhydric alcohol esters, fatty acid polyglycol esters, aliphatic alcohols, polyhydric alcohols, polyglycols, polyglycerols, metallic soap, silicon, and modified silicon. They may be used alone or in combination of two or more thereof.

The content of the lubricant is usually from 0.5 to 5 parts by mass with reference to 100 parts by mass of the thermoplastic resin particle composition.

Examples of the flame retardant include organic flame retardants, inorganic flame retardants, and reactive flame retardants. They may be used alone or in combination of two or more thereof.

The content of the flame retardant is usually from 0.5 to 30 parts by mass with reference to 100 parts by mass of the thermoplastic resin particle composition.

When the thermoplastic resin particle composition of the present invention contains a flame retardant, the flame retardant is preferably combined with a flame retardant aid. Examples of the flame retardant aid include antimony compounds such as diantimony trioxide, diantimony tetraoxide, diantimony pentaoxide, sodium antimonate, and antimonium tartaricum, zinc borate, barium metaborate, hydrated alumina, zirconium oxide, ammonium polyphosphate, tin oxide, and iron oxide. They may be used alone or in combination of two or more thereof.

The content of the antibacterial agent is usually from 0.1 to 5 parts by mass with reference to 100 parts by mass of the thermoplastic resin particle composition.

The coloring agent may be an inorganic pigment, an organic pigment, or a dye. They may be used in combination.

Examples of the inorganic pigment include oxides such as zinc white, titanium dioxide, red oxide, chromium oxide, and iron black; sulfides such as cadmium yellow, cadmium orange, and cadmium red; chromates such as chrome yellow, zinc yellow, and chromium vermilion; ferrocyanides such as Berlin blue; silicate salts such as ultramarine blue; and inorganic coloring agents such as carbon black and metal powder.

Examples of the organic pigment include phthalocyanine pigments, condensed azo pigments, azo lake pigments, quinacridone pigments, dioxazine pigments, isoindolinone pigments, and condensed polycyclic pigments.

Examples of the dye include anthraquinone dyes, perylene dyes, perinone dyes, quinoline dyes, nitro dyes, nitroso dyes, azo dyes, triphenyl dyes, thiazole dyes, methine dyes, oxazine dyes, indophenol dyes, ketone dyes, thiazine dyes, and indigo dyes.

The content of the coloring agent is usually 10 parts by mass or less, preferably from 0.0005 to 5 parts by mass, and more preferably from 0.001 to 2 parts by mass with reference to 100 parts by mass of the thermoplastic resin particle composition.

Examples of the light diffusing agent include crosslinked acryl particles, crosslinked silicon particles, very thin glass flakes, and calcium carbonate particles.

Examples of the photocatalytic antifouling agent include fine particles of titanium oxide and zinc oxide.

Examples of the impact modifier include graft rubber.

EXAMPLES

Examples of the process of the present invention for producing a thermoplastic resin molded product and the thermoplastic resin particle composition of the present invention are described below with reference to drawings.

Example 1

Figure 2:
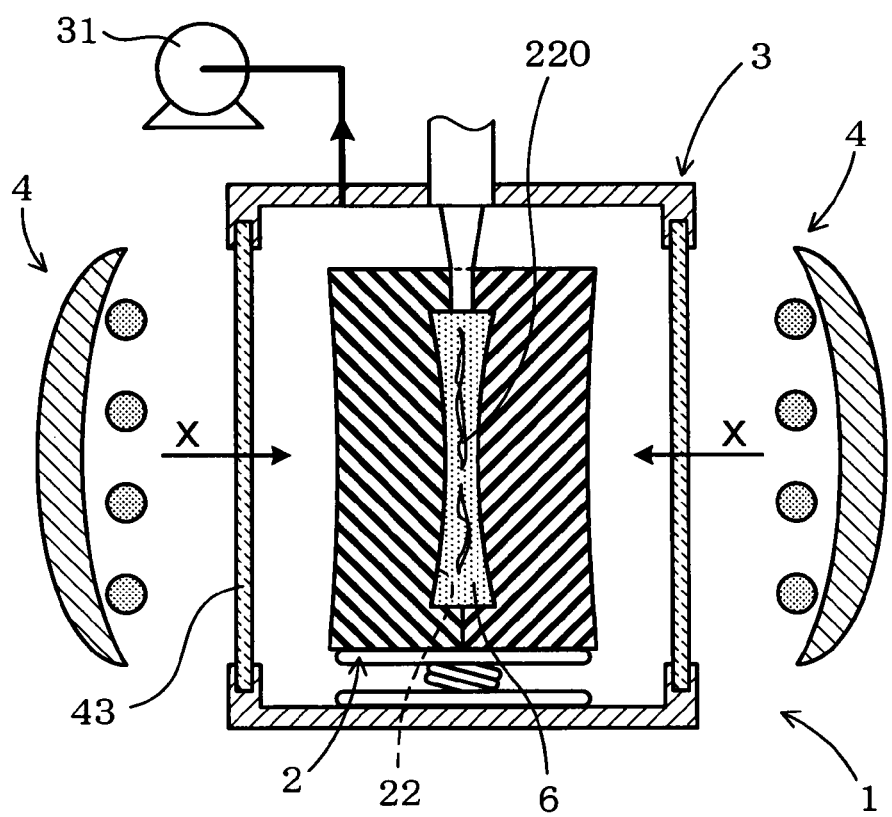
FIG. 2 is an illustration of the state during the particle heating step and the vacuum step of the process for producing a thermoplastic resin molded product in Example 1.
Figure 3:
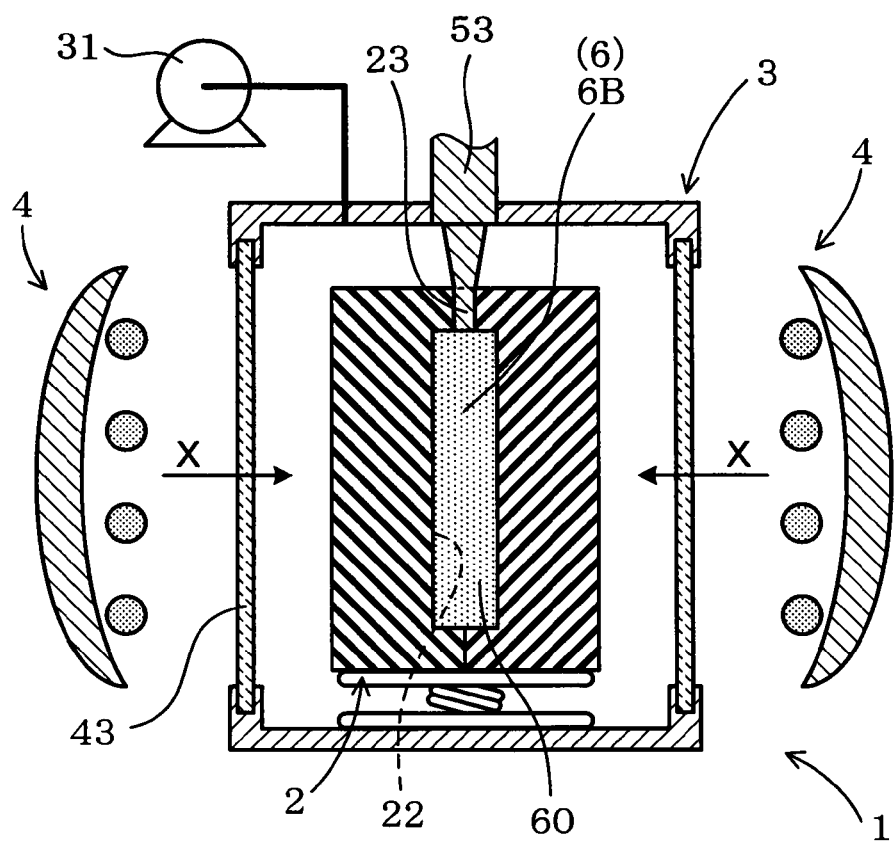
FIG. 3 is an illustration of the state after the filling step of the process for producing a thermoplastic resin molded product in Example 1.

The process for producing the thermoplastic resin molded product 60 of the present example includes: as shown in FIG. 1, a placement step of charging a thermoplastic resin (thermoplastic resin particle composition) 6A in a particulate state into a cavity 22 of a rubber die 2 made of a rubber material; as shown in FIG. 2, a particle heating step of irradiating the thermoplastic resin 6A in a particulate state in the cavity 22 with electromagnetic waves having wavelengths ranging from 0.78 to 2 µm through the rubber die 2, thereby heating to melt the thermoplastic resin 6 in a particulate (powdery) state; as shown in FIGS. 2 and 3, a filling step of filling a thermoplastic resin 6B in a molten state into a space 220 left in the cavity 22; and a cooling step of cooling a thermoplastic resin 6 in the cavity 22 thereby obtaining a thermoplastic resin molded product 60.

The process for producing the thermoplastic resin molded product 60 of the present example is described below in detail with reference to FIGS. 1 to 6.

In the present example, the thermoplastic resin 6 is an ABS resin which is a non-crystalline resin and a rubber-reinforced styrene resin.

The rubber die 2 of the present example is made of transparent or translucent silicone rubber. The rubber die 2 may be made by placing a master model (for example, a handmade actual object) of the thermoplastic resin molded product 60 to be molded in a liquid silicone rubber, curing the silicone rubber, cutting to open the cured silicone rubber, and taking out the master model from the silicone rubber.

As shown in FIG. 1, the rubber die 2 of the present example is composed of two split dies 21 divided by one parting surface 20. Alternatively, when the shape of the thermoplastic resin molded product 60 to be molded is complicated, the rubber die 2 may be composed of three or more split dies 21. During molding, a plurality of the split dies 21 maintain the combined state by any means for preventing mold opening. The parting surface 20 may be formed into an irregular wave shape, thereby facilitating the alignment of the split dies 21.

In the process of the present example for producing the thermoplastic resin molded product 60, injection molding of the thermoplastic resin 6 into the rubber die 2 is carried out using a molding machine 1. As shown in FIGS. 1 to 3, a molding machine 1 includes a pressure vessel 3, a vacuum pump 31, an injection cylinder 52, an ejection cylinder 53, an electromagnetic wave generation means 4, and a filter 43.

The pressure vessel 3 accommodates the rubber die 2, and creates a vacuum state by the vacuum pump 31 connected to the pressure vessel 3. The injection cylinder 52 injects the thermoplastic resin 6A in a particulate state into the cavity 22 through an inlet 23 formed in the rubber die 2. The ejection cylinder 53 ejects the thermoplastic resin 6B in a molten state under a specified pressure into the cavity 22 through the inlet 23 formed in the rubber die. In the present example, the pressure of the thermoplastic resin 6B in a molten state ejected from the ejection cylinder 53 into the rubber die 2 is from 0.5 to 5 MPa.

The electromagnetic wave generation means 4 includes an electromagnetic wave (light) generation source 41 and a reflector 42 for guiding the electromagnetic waves generated by the generation source 41 toward the rubber die 2. The electromagnetic wave generation means 4 of the present example includes a near-infrared halogen heater having a light intensity peak in the vicinity of about 1.2 μm in the near-infrared region. The near-infrared halogen heater emits electromagnetic waves having wavelengths ranging from 0.78 to 4 μm. The filter 43 of the present example is made of fused silica which decreases the transmission of the electromagnetic waves having wavelengths over 2 μm.

In FIGS. 2 and 3, the electromagnetic waves emitted from the electromagnetic wave generation means 4 are indicated with an arrow X.

The ABS resin used as the thermoplastic resin 6 has a higher absorbance of the electromagnetic waves (light) having wavelengths ranging from 0.78 to 2 μm (a scale representing the absorption intensity of light having a specific wavelength) than silicone rubber used as the rubber die 2 made of rubber. The absorbance may be measured using, for example, UV3100 manufactured by Shimadzu Co., Ltd.

Figure 4:
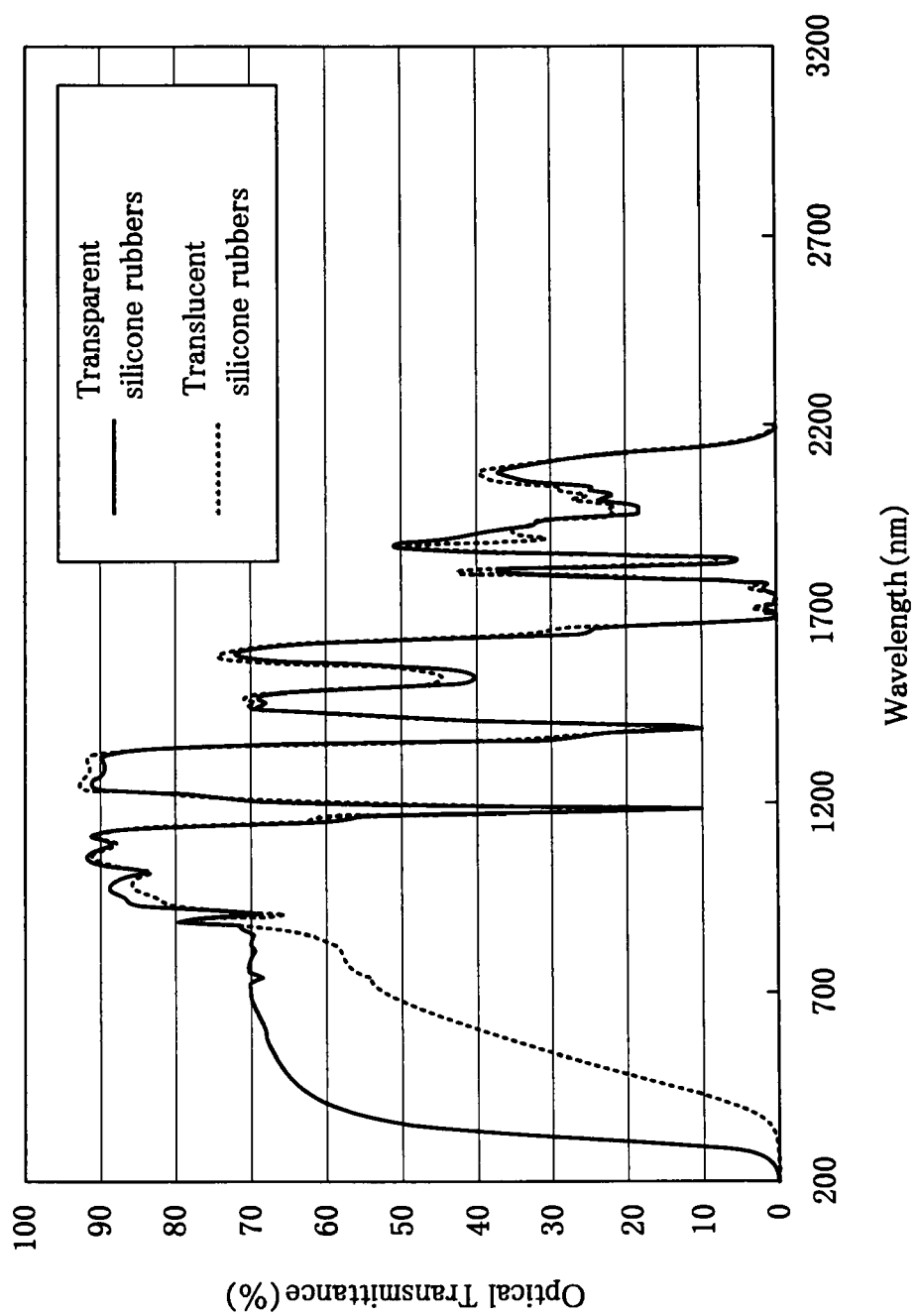
FIG. 4 shows graphs of the optical transmittance in the transparent and translucent silicone rubbers in Example 1, taking the wavelength (nm) as abscissa, and the optical transmittance (°) as ordinate.

FIG. 4 shows graphs of the optical transmittance in the transparent and translucent silicone rubbers, taking the wavelength (nm) as abscissa, and the optical transmittance (%) as ordinate. The graph indicates that the silicone rubbers transmit light having wavelengths ranging from 200 to 2200 (nm). Therefore, when near-infrared rays (light having wavelengths ranging from 0.78 to 2 μm) in the wavelength range is irradiated to the surface of the rubber die 2 made of silicone rubber, much of the near-infrared rays transmits through the rubber die 2 and is absorbed by the thermoplastic resin 6. Furthermore, the thermoplastic resin 6 is heated selectively in preference to the rubber die 2.

The process for producing the thermoplastic resin molded product 60 using the molding machine 1 is described below.

In the production process of the present example, the thermoplastic resin 6A in a particulate state and the thermoplastic resin 6B in a molten state are used for molding the thermoplastic resin molded product 60 by filling the thermoplastic resin 6 into the rubber die 2. In the present example, the thermoplastic resin 6A in a particulate state and the thermoplastic resin 6B in a molten state are made of an ABS resin having the same constitution.

When the thermoplastic resin molded product 60 is molded, firstly, as the placement step shown in FIG. 1, the injection cylinder 52 is set in the inlet 23 of the mold, and the thermoplastic resin 6A in a particulate state is filled into almost the whole of the cavity 22 of the rubber die 2. The thermoplastic resin 6A in a particulate state may be filled under its self weight, or using vibration or air stream. Subsequently, as the vacuum step shown in FIG. 2, the vacuum pump 31 vacuums the pressure vessel 3, thereby vacuuming the space 220 left in the cavity 22 of the rubber die 2.

Subsequently, as the particle heating step shown in FIG. 2, the electromagnetic waves having wavelengths ranging from 0.78 to 4 μm emitted from the electromagnetic wave generation means 4 is transmitted through the filter 43, and the transmitted electromagnetic passed through the filter 43 is irradiated to the thermoplastic resin 6 in the cavity 22 through the rubber die 2. At that time, the thermoplastic resin 6A in a particulate state is selectively heated (the thermoplastic resin 6 is more heated) in preference to the rubber die 2, based on the difference of the physical properties of the rubber material composing the rubber die 2 and the thermoplastic resin 6 in a powdery state. As a result of this, the thermoplastic resin 6A in a particulate state is melted with the temperature rise of the rubber die 2 suppressed. In addition, as a result of the melting of the thermoplastic resin 6A in a particulate state, the space 220 to be filled with the thermoplastic resin 6 is newly formed in the cavity 22.

Subsequently, as the filling step shown in FIG. 3, the ejection cylinder 53 is set in the inlet 23 of the mold, and the thermoplastic resin 6B in a molten state is filled into the space 220 left in the cavity 22 under an injection pressure of 0.5 to 5 MPa. In the filling step of the present example, irradiation of the thermoplastic resin 6 with the transmitted electromagnetic waves through the rubber die 2 is continued, thereby heating the thermoplastic resin 6 in the cavity 22.

When the thermoplastic resin 6B in a molten state is filled, the lower part of the cavity 22 of the rubber die 2 in a vertical direction is filled with the thermoplastic resin 6 produced by melting the thermoplastic resin 6A in a particulate state, thereby reducing the amount of the thermoplastic resin 6B in a molten state to be newly filled.

As a result of this, the thermoplastic resin 6 is filled into the whole of the cavity 22 without increasing the filling pressure (injection pressure) so high, whereby the deformation and opening of the rubber die 2 are effectively prevented. Therefore, resin leakage at the parting surface 20 in the rubber die 2 is prevented, and the thermoplastic resin molded product 60 obtained through the cooling step has effectively improved properties such as shape and surface accuracy.

In addition, the thermoplastic resin 6A in a particulate state and the thermoplastic resin 6B in a molten state are made of the thermoplastic resin 6 having the same constitution, whereby the formation of an interface between different resins is prevented in the thermoplastic resin molded product 60.

Therefore, according to the process of the present example for producing the thermoplastic resin molded product 60, when the thermoplastic resin 6 is molded using the rubber die 2, the thermoplastic resin molded product 60 has effectively improved properties such as shape and surface accuracy. The present example is markedly effective when the thermoplastic resin molded product 60 to be molded is large or thin-walled, or when the thermoplastic resin 6 used for molding has a high viscosity.

(Confirmatory Test 1)

In the present confirmatory test, the thermoplastic resin 6A in a particulate state having different particle sizes (hereinafter referred to as particles) were used. On the basis of the difference of the particle size, the difference of the temperature rise rate when heated by the electromagnetic wave generation means 4 (near-infrared halogen heater) was measured. The particles used in the present confirmatory test were classified by sieves of different sizes. The sample A was retained on a sieve having an aperture of 710 μm, the sample B was retained on a sieve having an aperture of 250 μm after passing through a sieve having an aperture of 710 μm, the sample C passed through a sieve having an aperture of 250 μm, and the sample D had a volume average particle size of 55 μm. The sample E was a 1:1 mixture of the samples A and C, and the sample was a 1:1 mixture of the samples A and D.

In order to measure the temperature rise rate, an O ring was placed on a silicone rubber stage, the particles were filled into the O ring, and fused silica as a filter was placed on the O ring. The particles were irradiated through the filter with electromagnetic waves having wavelengths ranging from 0.78 to 2 μm emitted from a near-infrared halogen heater (voltage: 80 V), and the particle temperature was measured by a thermocouple. The electromagnetic waves were irradiated until the temperatures of the samples A to F reached 250° C., the distance between the near-infrared halogen heater and the filter was 200 mm, the thickness of the fused silica was 5 mm, and the inside diameter of the O ring was 30.4 mm.

Figure 5:
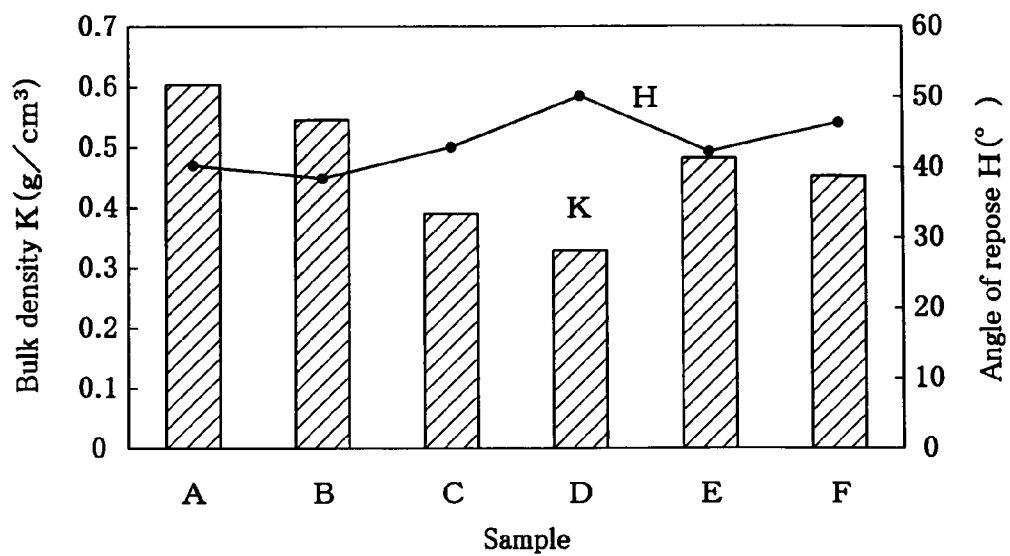
FIG. 5 shows graphs of the bulk density (g/cm$^3$) and the angle of repose (°) of the particle samples in Example 1.

FIG. 5 indicates that the smaller the sample particle size is, the smaller the bulk density is. On the other hand, the smaller the sample particle size is, the larger the angle of repose is, though not necessarily correct.

Figure 6:
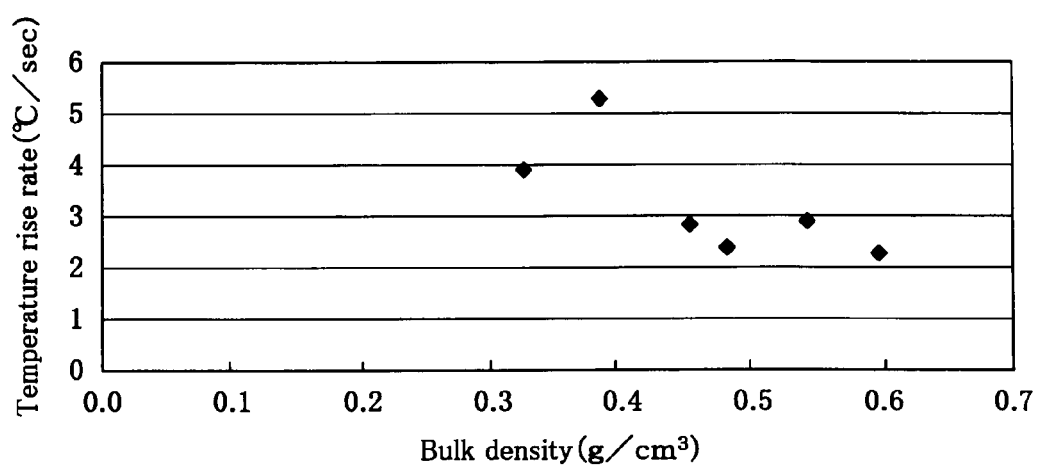
FIG. 6 shows a graph illustrating the relationship between the bulk density (g/cm$^3$) and the temperature rise rate (° C./sec) of the particle samples in Example 1.

FIG. 6 indicates that the smaller the sample particle size (bulk density) is, the higher the temperature rise rate is. The temperature rise rates of the samples C and D having a small particle size were so high that there was a large difference in the particle temperature between the side irradiated with the electromagnetic waves and the other side, which resulted in the development of burning defects in the particles. The result suggests that the bulk density of the particles (thermoplastic resin 6A in a particulate state) is preferably 0.4 g/cm$^3$ or more.

On the other hand, when the bulk density increases with the increase of the particle size, the temperature rise rate decreases, which results in the necessity of increasing the time of electromagnetic wave irradiation for heating the particles. As a result of this, the rubber die 2 may develop a defect such as burning. On that account, the bulk density of the particles (thermoplastic resin 6A in a particulate state) may be 0.8 g/cm$^3$ or less, and is more preferably 0.7 g/cm$^3$ or less.

The temperature rise rates of the samples A and B were favorable, suggesting that the particle size of the particles is preferably more than 250 μm. The temperature rise rates of the samples E and F were also favorable, suggesting that the particles having particle sizes of more than 250 μm and 250 μm or less may be mixed.

The average particle size of the particles may be, for example, from 300 to 2000 μm, and is more preferably from 350 to 1500 μm. The angle of repose of the particles may be 48° or less, and is more preferably 46° or less.

Example 2

The thermoplastic resin particle composition 6A of the present example is to be filled into the cavity 22 of the rubber die 2 made of a rubber material, and heated to be melted by irradiation with electromagnetic waves having wavelengths ranging from 0.78 to 2 μm through the rubber die 2. The thermoplastic resin particle composition 6A contains 0.1 to 20% by mass of the small thermoplastic resin particles 62 having a particle size of 1 to 100 μm, the balance being the large thermoplastic resin particles 61 having a particle size of 200 to 3000 μm.

TABLE 1

| Samples | Particle Size (μm) | Bulk Density (g/cm$^3$) | Angle of Repose (°) | Tempeature Rise Rate (° C./sec) | Mass (g) |
|---|---|---|---|---|---|
| A | 710 μmON | 0.596 | 40.2 | 2.26 | 1.63 |
| B | 710 μmPass~250 μmON | 0.541 | 38.6 | 2.88 | 1.51 |
| C | 250 μmPass | 0.384 | 43.0 | 5.29 | 1.15 |
| D | Volume Average Particle Size 55 μm | 0.326 | 50.4 | 3.90 | 0.95 |
| E | A:C = 1:1 | 0.481 | 42.3 | 2.40 | 1.43 |
| F | A:D = 1:1 | 0.452 | 46.6 | 2.82 | 1.29 |

Table 1 lists the measurements of the bulk density (g/cm$^3$), angle of repose (°), temperature rise rate (° C./sec), and mass (g) of the samples A to F. FIG. 5 shows graphs of the bulk density and angle of repose of the samples A to F, and FIG. 6 shows the relationship between the bulk density and the temperature rise rate of the samples A to F. In FIG. 5, the bar graph shows the bulk density G, and the line graph shows the angle of repose H.

The thermoplastic resin 6 (the large thermoplastic resin particles 61, small thermoplastic resin particles 62, and thermoplastic resin particles 6B in a molten state) used in the present example is an ABS resin which is a non-crystalline rubber-reinforced styrene resin.

Subsequently, the process for producing the thermoplastic resin molded product 60 using the molding machine 1 is described in detail with reference to FIGS. 1 to 3.

In the process of the present example for producing the thermoplastic resin molded product 60, the thermoplastic resin particle composition 6A and the thermoplastic resin 6B in a molten state are used for molding thermoplastic resin molded product 60 by filling the thermoplastic resin 6 into the rubber die 2. In the present example, the thermoplastic resin particle composition 6A and the thermoplastic resin 6B in a molten state are ABS resins having the same constitution.

When the thermoplastic resin molded product 60 is molded, firstly, as the placement step shown in FIG. 1, the small thermoplastic resin particles 62 having a particle size of 1 to 100 μm are sprinkled over the surface of the cavity 22 at the split die 21 of the rubber die 2 in an opened state. Subsequently, the injection cylinder 52 is set in the inlet 23 of the rubber die 2 in a closed state, and the large thermoplastic resin particles 61 having a particle size of 200 to 3000 μm are charged into the cavity 22 of the rubber die 2. At that time, the thermoplastic resin particle composition 6A charged into the cavity 22 is composed of 80 to 99.9% by mass of the large thermoplastic resin particles 61, and 0.1 to 20% by mass of the small thermoplastic resin particles 62. The thermoplastic resin particle composition 6A is placed in (filled into) almost the whole of the cavity 22.

When the small thermoplastic resin particles 62 are sprinkled over the surface of the cavity 22, most part of the small thermoplastic resin particles 62 adheres to the inner wall surface 221 of the cavity 22. The small thermoplastic resin particles 62 effectively adhere to the inner wall surface 221 of the cavity 22 made of silicone rubber, because the rubber die 2 of the present example is made of silicone rubber, and the small thermoplastic resin particles 62 have a particle size of 1 to 100 μm.

When the large thermoplastic resin particles 61 are charged into the cavity 22, the small thermoplastic resin particles 62 adhere to the inner wall surface 221 of the cavity 22. As a result of this, the large thermoplastic resin particles 61 pass (fall) on the inner side of the small thermoplastic resin particles 62 in the cavity 22. Therefore, the thermoplastic resin particles 61 and 62 are smoothly filled into the cavity 22. The large and small thermoplastic resin particles 61 and 62 may be filled under their self weights, or using vibration or air stream.

Subsequently, as the vacuum step shown in FIG. 2, the vacuum pump 31 vacuums the pressure vessel 3, thereby vacuuming the space 220 left in the cavity 22 of the rubber die 2.

Subsequently, as the particle heating step shown in FIG. 2, the electromagnetic waves having wavelengths ranging from 0.78 to 4 μm emitted from the electromagnetic wave generation means 4 are transmitted through the filter 43, and the transmitted electromagnetic waves after passing through the filter 43 are irradiated to the thermoplastic resin particle composition 6A in the cavity 22 through the rubber die 2. At that time, the thermoplastic resin particle composition 6A is selectively heated (the thermoplastic resin particle composition 6A is more strongly heated) in preference to the rubber die 2, based on the difference of the physical properties of the rubber material composing the rubber die 2 and the thermoplastic resin particle composition 6A. As a result of this, the thermoplastic resin particle composition 6A is melted with the temperature rise of the rubber die 2 suppressed. In addition, as a result of the melting of the thermoplastic resin particle composition 6A, the space 220 to be filled with the thermoplastic resin 6 is newly formed in the cavity 22.

The state of the cavity 22 after the particle heating step varies according to the molding conditions. For example, when the thermoplastic resin 6 has poor flowability, the thermoplastic resin 6 in a molten state will not readily fall into the lower part of the cavity 22, and many bubbles likely accumulate in the middle of the cavity 22. When the thermoplastic resin 6 has good flowability, the thermoplastic resin 6 in a molten state likely fall into the lower part of the cavity 22. When the vacuum step is carried out as in the present example, the rubber die 2 will be deformed to collapse the gap (space 220) in the cavity 22, and the thermoplastic resin 6 is likely present on the surface of the cavity 22.

Subsequently, as the filling step shown in FIG. 3, the ejection cylinder 53 is set in the inlet 23 of the mold, and the thermoplastic resin 6B in a molten state is filled into the space 220 left in the cavity 22 under an injection pressure of 0.1 to 5 MPa. In the filling step of the present example, irradiation of the thermoplastic resin 6 with the transmitted electromagnetic waves through the rubber die 2 is continued, thereby heating the thermoplastic resin 6 in the cavity 22.

When the thermoplastic resin 6B in a molten state is filled, the surface of the cavity 22 of the rubber die 2 (rubber surface) is filled with the thermoplastic resin 6 produced by melting the thermoplastic resin particle composition 6A, thereby reducing the amount of the thermoplastic resin 6B in a molten state to be newly filled.

As a result of this, the thermoplastic resin 6 is filled into the whole of the cavity 22 without increasing the filling pressure (injection pressure) so high, whereby the deformation and opening of the rubber die 2 are effectively prevented. Therefore, resin leakage at the parting surface 20 in the rubber die 2 is prevented, and the thermoplastic resin molded product 60 obtained through the cooling step has effectively improved properties such as appearance, shape and surface accuracy, and mechanical strength.

The thermoplastic resin particle composition 6A and the thermoplastic resin 6B in a molten state are made of the thermoplastic resin 6 having the same constitution, thereby preventing the formation of an interface between resins in the resultant thermoplastic resin molded product 60.

Therefore, according to the process of the present example for producing the thermoplastic resin molded product 60, when the thermoplastic resin 6 is molded using the rubber die 2, the thermoplastic resin molded product 60 has effectively improved properties such as appearance, shape, and surface accuracy, and mechanical strength. The present example is markedly effective when the thermoplastic resin molded product 60 to be molded is large or thin-walled, or when the thermoplastic resin 6 used for molding has a high viscosity.

(Effect Simulation)

Figure 7:
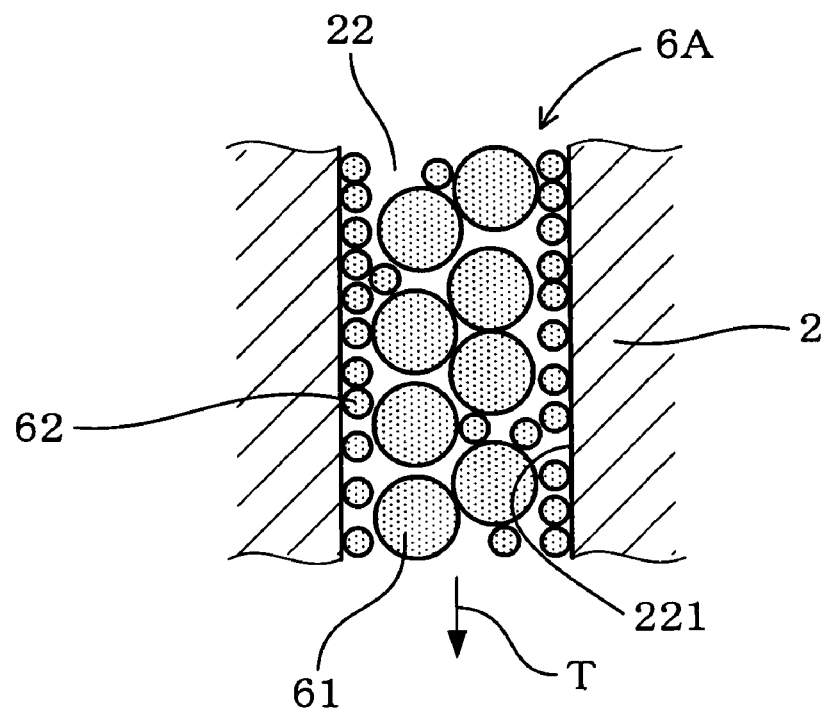
FIG. 7 shows a state of filling the small and large thermoplastic resin particles into the cavity of the rubber die in Example 2.
Figure 8:
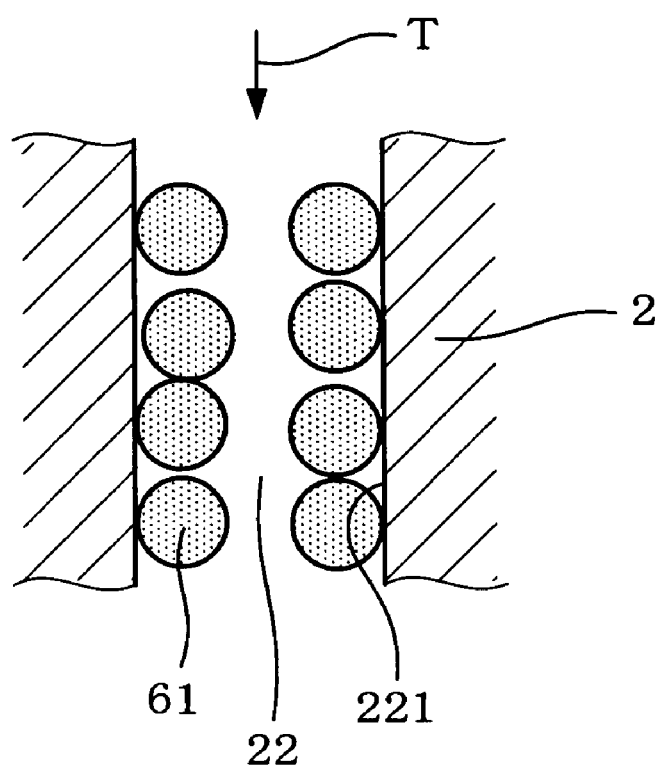
FIG. 8 shows a state of filling the large thermoplastic resin particles alone into the cavity of the rubber die in Example 2.

FIGS. 7 and 8 are enlarged views of the states of filling the thermoplastic resin particles 61 and 62 into the cavity 22 of the rubber die 2. FIG. 7 shows a state of filling the large and small thermoplastic resin particles 61 and 62 into the cavity 22, and FIG. 8 shows a state of filling the large thermoplastic resin particles 61 alone into the cavity 22.

As shown in FIG. 8, when the large thermoplastic resin particles 61 are filled alone into the cavity 22, the large thermoplastic resin particles 61 adhere to the inner wall surface 221 of the cavity 22. In this case, it is likely difficult that another large thermoplastic resin particles 61 pass (fall) on (indicated by an arrow T) the inner side of the large thermoplastic resin particles 61.

On the other hand, as shown in FIG. 7, when the large thermoplastic resin particles 61 are filled into the cavity 22 after filling the small thermoplastic resin particles 62, the small thermoplastic resin particles 62 effectively adhere to the inner wall surface 221 of the cavity 22, and the large thermoplastic resin particles 61 likely pass (fail) on (indicated by an arrow T) the inner side of the small thermoplastic resin particles 62 with little adhesion to the inner wall surface 221 of the cavity 22. As a result of this, almost the whole of cavity 22 is likely effectively filled with the thermoplastic resin particle composition 6A.

(Confirmatory Test 2)

The present confirmatory test examined improvements in properties (surface appearance) and mechanical strength (impact resistance) achieved by the use of the thermoplastic resin particle composition 6A in Example 2 for the molding of a thermoplastic molded product.

In the present confirmatory test, five types of thermoplastic resin particles (particles A, B, C, D, and E) were prepared.

(Particle A) 100 parts by mass of an ABS resin ("TECHNO ABS 330" manufactured by Techno Polymer Co., Ltd., MFR 42 (g/10 min)) and 0.5 parts by mass of carbon black were extruded using a single screw extruder (40 mm diameter, cylinder temperature 220° C.) to obtain black thermoplastic resin particles. The black thermoplastic resin particles were formed into particles A having a number average particle size of 700 μm using an extruder equipped with a strand cutter (for micropellets) manufactured by Gala Industries, Inc. The particles A had a bulk density of 0.63 g/cm³ as measured according to JIS K7365.

The number average particle size was measured through the image analysis of micrographs using an image analysis software ("Image Pro Plus", manufactured by Media Cybernetics Inc.). 100 or more samples were subjected to image processing.

In the present confirmatory test, a rectangular cavity 22 having a size of 125 mm×12.5 mm×3.2 mm was made from silicone rubber. The minimum width dimension of the cavity 22 was 3.2 mm. Using the molding machine 1 described in Example 1, the particles A, B, C, D, and E were respectively tilted into the cavity 22, and then heated to be melted. A thermoplastic resin in a molten state was additionally filled, and then cooled to obtain samples of a thermoplastic resin molded product.

Table 2 lists the results of the observation of surface appearance and the measurements of the impact resistance of the inventions 1 to 5 molded from the thermoplastic resin particle composition 6A composed of any of the particles A, B, C, C, and E, and the comparisons 1 to 3 molded from the thermoplastic resin particles composed of the particles A, B, or C.

TABLE 2

|  | Inventions | | | | | Comparisons | | |
| --- | --- | --- | --- | --- | --- | --- | --- | --- |
|  | 1 | 2 | 3 | 4 | 5 | 1 | 2 | 3 |
| Particles A (Number Average Particle Size 700 μm) (% by mass) | 99.5 | 99 | 95 |  |  | 100 | 75 | 99 |
| Particles B (Number Average Particle Size 55 μm) (% by mass) | 0.5 | 1 | 5 | 0.5 | 0.5 |  | 25 |  |
| Particles C (Number Average Particle Size 3500 μm) (% by mass) |  |  |  |  |  |  |  | 1 |
| Particles D (Number Average Particle Size 1300 μm) (% by mass) |  |  |  | 99.5 |  |  |  |  |
| Particles E (Number Average Particle Size 460 μm) (% by mass) |  |  |  |  | 99.5 |  |  |  |
| Surface Appearance | ○ | ○ | ○ | ○ | ○ | — | X | — |
| Impact Resistance (kJ/m2) | 9 | 12 | 10 | 10 | 9 | — | 4 | — |

(Particles B) The black thermoplastic resin particles were freeze-crushed using a freeze crusher (manufactured by Imoto Machinery Co., Ltd.) to obtain the particles B having a number average particle size of 55 μm. The particles B had a bulk density of 0.33 g/cm³ as measured according to JIS K7365. The particles B had a particle size of 1 to 100 μm.

(Particles C) The black thermoplastic resin particles were used as they were to obtain the particles C having a number average particle size of 3500 μm. The particles C had a bulk density of 0.65 g/cm³ as measured according to JIS K7365.

(Particles D) The black thermoplastic resin particles were freeze-crushed using a freeze crusher (manufactured by Imoto Machinery Co., Ltd.), and then sieved to obtain the particles D having a number average particle size of 1300 μm. The particles D had a bulk density of 0.59 g/cm³ as measured according to CIS K7365.

(Particles E) The black thermoplastic resin particles were freeze-crushed using a freeze crusher (manufactured by Imoto Machinery Co., Ltd.), and then sieved to obtain the particles E having a number average particle size of 460 μm. The particles E had a bulk density of 0.51 g/cm³ as measured according to JIS K7365.

The particles A, C, D, and E are free from thermoplastic resin particles having a particle size of 100 μm or less.

The properties (surface appearance) were rated on the basis of visual observation of the surface appearance of the thermoplastic resin molded product; a good molded product having no strain or burning was rated as ○, a thermoplastic resin molded product having strain on a part of its surface was rated as Δ, and a thermoplastic resin molded product having strain or a defect was rated as x, and those which could not be evaluated were rated as –.

The mechanical strength (impact resistance) was measured in terms of charpy impact strength according to ISO179 (notched, thickness: 3.2 mm).

As a result of visual observation of the surface appearance, the inventions 1 to 5 were rated as ○, indicating that they are superior in good surface appearance and impact resistance. On the other hand, the comparison 2 developed burning, and gave poor results for the surface appearance and impact resistance. The reason for this is likely that the mixing proportion of the particles B was as high as 25% by mass. The comparisons 1 and 3 could not be molded, and thus no rating was given for the surface appearance and impact resistance.

These results indicate that the use of the thermoplastic resin particle composition 6A containing the large and small thermoplastic resin particles 61 and 62 described in Example 2 allows molding of the thermoplastic resin molded product 60 having good properties and mechanical strength.

Example 3

The thermoplastic resin particle composition 6A of the present example is to be filled into the cavity 22 of the rubber die 2 made of a rubber material, and heated to be melted by irradiation with electromagnetic waves having wavelengths ranging from 0.78 to 2 μm through the rubber die 2. The thermoplastic resin particle composition 6A contains the thermoplastic resin particles 61 and the fine particles 62 of at least one of an inorganic powder and a lubricant. The number average particle size of the thermoplastic resin particles 61 is from 200 to 3000 μm, and the number average particle size of the fine particles 62 is from 0.5 to 50 μm. The thermoplastic resin particle composition 6A of the present example contains 0.1 to 10 parts by mass of the fine particles 62 with reference to 100 parts by mass of the thermoplastic resin particles 61.

The thermoplastic resin used in the present example is an ABS resin which is a non-crystalline rubber-reinforced styrene resin.

The process for producing the thermoplastic resin molded product 60 using the molding machine 1 is describe below in detail with reference to FIGS. 1 to 3.

In the process of the present example for producing the thermoplastic resin molded product 60, the thermoplastic resin particle composition 6A and the thermoplastic resin 6B in a molten state are used for molding the thermoplastic resin molded product 60 by filling the thermoplastic resin 6 into the rubber die 2. In the present example, the thermoplastic resin particle composition 6A and the thermoplastic resin 6B in a molten state are ABS resins having the same constitution.

When the thermoplastic resin molded product 60 is molded, firstly, as the placement step shown in FIG. 1, the fine particles 62 having a volume average particle size of 0.5 to 50 μm are sprinkled over the surface of the cavity 22 at the split die 21 of the rubber die 2 in an opened state. Subsequently, the injection cylinder 52 is set in the inlet 23 of the mold, and the thermoplastic resin particles 61 having a number average particle size of 200 to 3000 μm are charged into the cavity 22 of the rubber die 2. At that time, the thermoplastic resin particle composition 6A charged into the cavity 22 is composed of 0.1 to 10 parts by mass of the fine particles 62 with reference to 100 parts by mass of the thermoplastic resin particle 61. The thermoplastic resin particle composition 6A is filled into almost the whole of the cavity 22.

When the fine particles 62 are sprinkled over the surface of the cavity 22, most part of the fine particles 62 adheres to the inner wall surface 221 of the cavity 22. The fine particles 62 effectively adhere to the inner wall surface of the cavity 22 made of silicone rubber, because the rubber die 2 of the present example is made of silicone rubber, and the fine particles 62 have a volume average particle size of 0.5 to 50 μm.

When the thermoplastic resin particles 61 are charged into the cavity 22, the fine particles 62 are adhered to the inner wall surface 221 of the cavity 22. As a result of this, the thermoplastic resin particles 61 pass (fall) on the inner side of the fine particles 62 in the cavity 22. Therefore, the thermoplastic resin particles 61 are smoothly filled into the cavity 22. The fine particles 62 and the thermoplastic resin particles 61 may be filled under their self weights, or using vibration or air stream.

Subsequently, also in the present example, in the same manner as in Example 2, the vacuum step, particle heating step (see FIG. 2), and the filling step (see FIG. 3) may be carried out, thereby obtaining the thermoplastic resin molded product 60 having good properties such as appearance, shape, and surface accuracy, and high mechanical strength.

The structure of the molding machine 1 used in the present example is the same as that used in Example 1, and the structure and effect of the production process of the present example are the same as those in Example 2.

(Effect Simulation)

The effect simulation for the use of the thermoplastic resin particles 61 and fine particles 62 of the present example is illustrated by, in FIG. 7, replacing the large thermoplastic resin particles 61 of Example 2 with the thermoplastic resin particles 61, the small thermoplastic resin particles 62 of Example 2 with the fine particles 62, and, in FIG. 8, the large thermoplastic resin particles 61 of Example 2 with the thermoplastic resin particles 61. The present example will achieve the same effect as Example 2.

(Confirmatory Test 3)

The present confirmatory test examined improvements in properties (surface appearance) and mechanical strength (impact resistance) achieved by the use of the thermoplastic resin particle composition 6A in Example 3 for the molding of a thermoplastic molded product.

The five types of thermoplastic resin particles (particles A, B, C, D, and E) used in the present confirmatory test are the same as those used in Example 2. The present confirmatory test used two types of talc (talc A and B), and a lubricant.

(Talc A) Fine powder talc "MICRO ACE K-1" (trade name, manufactured by Nippon Talc Co., Ltd.) was used. The volume average particle size ($D_{50}$) was 8 μm as measured by laser diffractometry.

(Talc B) General-purpose talc "MS" (trade name, manufactured by Nippon Talc Co., Ltd.) was used. The volume average particle size ($D_{50}$) was 14 μm as measured by laser diffractometry.

(Lubricant) Magnesium stearate "SM-1000" (manufactured by Sakai Chemical Industry Co., Ltd.) was used. The volume average particle size ($D_{50}$) was 9 μm as measured by laser diffractometry.

The number average particle size was measured through the image analysis of micrographs using an image analysis software ("Image Pro Plus", manufactured by Media Cybernetics Inc.). 100 or more samples were subjected to image processing.

In the present confirmatory test, a rectangular cavity 22 having a size of 125 mm×12.5 mm×3.2 mm was made from silicone rubber. The minimum width dimension of the cavity 22 was 3.2 mm. Using the molding machine 1 described in Example 1, the particles A, B, C, D, and E were respectively filled into the cavity 22, and heated to be melted. A thermoplastic resin in a molten state was additionally filled, and then cooled to obtain samples of a thermoplastic resin molded product.

Table 3 lists the results of the observation of surface appearance and the measurements of the impact resistance of the inventions 1 to 6 molded from the thermoplastic resin particle composition 6A composed of the particles A, D, and E, and the talc or lubricant, and the comparisons 1 to 3 molded from the thermoplastic resin particles composed of the particles A alone, or the particles B or C.

TABLE 3

|  | Inventions | | | | | | Comparisons | | |
| --- | --- | --- | --- | --- | --- | --- | --- | --- | --- |
|  | 1 | 2 | 3 | 4 | 5 | 6 | 1 | 2 | 3 |
| Particles A (Number Average Particle Size 700 μm) (% by mass) | 100 | 100 | 100 | 100 |  |  | 100 |  |  |
| Particles B (Number Average Particle Size 550 μm) (% by mass) |  |  |  |  |  |  |  | 100 |  |
| Particles C (Number Average Particle Size 3500 μm) (% by mass) |  |  |  |  |  |  |  |  | 100 |
| Particles D (Number Average Particle Size 1300 μm) (% by mass) |  |  |  |  | 100 |  |  |  |  |
| Particles E (Number Average Particle Size 460 μm) (% by mass) |  |  |  |  |  | 100 |  |  |  |
| Talc A (8 μm) (Parts by Mass) | 0.5 | 1 |  |  | 0.5 | 0.5 |  | 0.5 | 0.5 |
| Talc B (14 μm) (Parts by Mass) |  |  | 0.5 |  |  |  |  |  |  |
| Lublicant (9 μm) (Parts by Mass) |  |  |  | 0.5 |  |  |  |  |  |
| Surface Appearance | ○ | ○ | ○ | ○ | ○ | ○ | — | X | — |
| Impact Resistance (kJ/m$^2$) | 8 | 6 | 7 | 9 | 8 | 7 | — | 3 | — |

The properties (surface appearance) were rated on the basis of visual observation of the surface appearance of the thermoplastic resin molded product; a good molded product having no strain or burning was rated as ○, a thermoplastic resin molded product having strain on a part of its surface was rated as Δ, and a thermoplastic resin molded product having strain or a defect was rated as x, and those which could not be evaluated were rated as –.

The mechanical strength (impact resistance) was measured in terms of charpy impact strength according to ISO179 (notched, thickness: 3.2 mm).

As a result of visual observation of the surface appearance, the inventions 1 to 6 were rated as ○, indicating that they are superior in good surface appearance and impact resistance. On the other hand, the comparison 2 developed burning, and gave poor results for the surface appearance and impact resistance. The reason for this is likely that the number average particle size of the particles B is as small as 55 μm. The comparisons 1 and 3 could not be molded, and thus no rating was given for the surface appearance and impact resistance.

These results indicate that the use of the thermoplastic resin particle composition 6A containing the thermoplastic resin particles 61 and the fine particles 62 described in Example 3 allows molding of the thermoplastic resin molded product 60 having good properties and mechanical strength.

Example 4

The thermoplastic resin composition 6A of the present example is to be filled into the cavity 22 of the rubber die 2 made of a rubber material, and heated to be melted by irradiation with electromagnetic waves having wavelengths ranging from 0.78 to 2 μm through the rubber die 2. The thermoplastic resin composition 6A contains 0.0005 to 0.1 parts by mass of an infrared ray absorbing agent with reference to 100 parts by mass of the thermoplastic resin such that the thermoplastic resin molded product 60 has a haze value of 20% or less.

The thermoplastic resin used in the present example is a transparent ABS resin which is a non-crystalline rubber-reinforced styrene resin.

Figure 9:
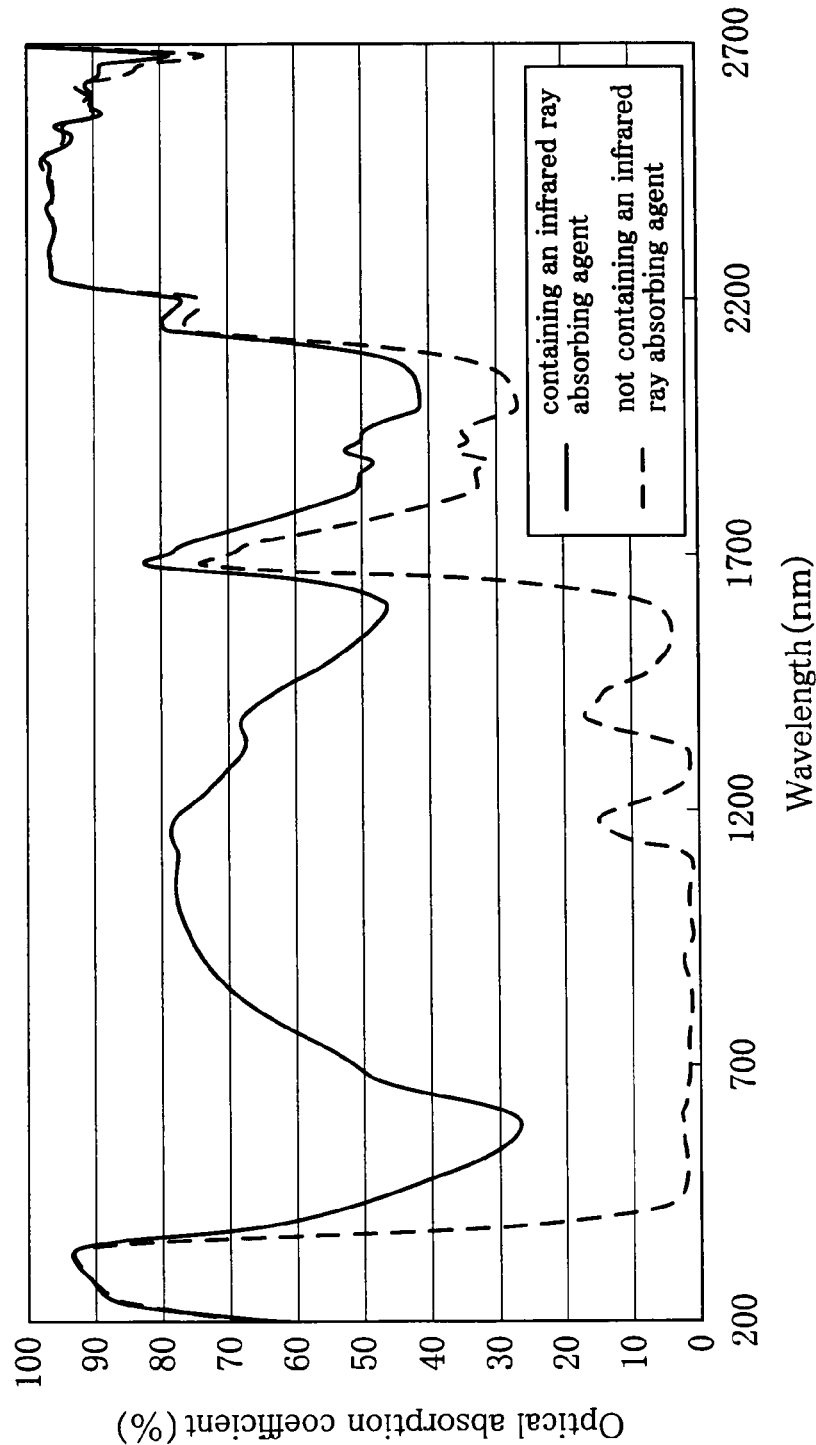
FIG. 9 shows graphs of the optical absorption coefficient (%) of the thermoplastic resins free of or containing an infrared ray absorbing agent in Example 4, taking the wavelength (nm) as abscissa, and the optical absorption coefficient (%) as ordinate.

FIG. 9 shows graphs showing the difference of the optical absorption coefficient between the thermoplastic resin containing no infrared ray absorbing agent (indicated with a broken line) and that containing an infrared ray absorbing agent (indicated with a solid line), taking the wavelength (nm) as abscissa, and the optical absorption coefficient (%) as ordinate. FIG. 9 indicates that the thermoplastic resin composition containing an infrared ray absorbing agent achieves a higher absorption coefficient of near-infrared rays having wavelengths from 0.78 to 2 μm than the thermoplastic resin containing no infrared ray absorbing agent. The thermoplastic resin containing no infrared ray absorbing agent corresponds to the comparison 1 in the below described confirmatory test 4, and the thermoplastic resin containing an infrared ray absorbing agent corresponds to the invention 2 in the below-described confirmatory test 4.

In the process of the present example for producing the thermoplastic resin molded product 60, the thermoplastic resin composition 6A and the thermoplastic resin 6B in a molten state are used for molding the thermoplastic resin molded product 60 by filling the thermoplastic resin 6 into the rubber die 2. In the present example, the thermoplastic resin composing the thermoplastic resin composition 6A and the thermoplastic resin 6B in a molten state are ABS resins having the same constitution. The large and small thermoplastic resin particles 61 and 62 used as the thermoplastic resin composition 6A contain an infrared ray absorbing agent in the same proportions.

When the thermoplastic resin molded product 60 is molded, firstly, as the placement step shown in FIG. 1, the small thermoplastic resin particles 62 having a particle size of 1 to 100 μm are sprinkled over the inner wall surface 221 of the cavity 22 at the split die 21 of the rubber die 2 in an opened state.

Subsequently, the injection cylinder 52 is set in the inlet 23 of the rubber die 2 in a closed state, and the large thermoplastic resin particles 61 having a particle size of more than 100 μm to 3000 μm or less are charged into the cavity 22 of e rubber die 2. At that time, the thermoplastic resin composition 6A charged into the cavity 22 is composed of 80 to 99.9% by mass of the large thermoplastic resin particles 61, and 0.1 to 20% by mass of the small thermoplastic resin particles 62. The thermoplastic resin composition 6A is filled into almost the whole of the cavity 22.

Subsequently, also in the present example, in the same manner as in Example 2, the vacuum step, particle heating step (see FIG. 2), and the filling step (see FIG. 3) are carried out, thereby obtaining the thermoplastic resin molded product 60 having good properties such as appearance, shape, and surface accuracy, and high mechanical strength.

In the particle heating step of the present example, the infrared ray absorbing agent contained in the large thermoplastic resin particles 61 allows effective absorption of the electromagnetic waves, in spite of the use of the transparent thermoplastic resin, and thus allows quick heating and melting of the thermoplastic resin composition 6A.

Therefore, according to the process of the present example for producing the thermoplastic resin molded product 60, the addition of an infrared ray absorbing agent allows quick molding of the transparent thermoplastic resin molded product 60 having a haze value of 20% or less, which is an index representing the transparency of the resin, by irradiation with electromagnetic waves. In addition, the rubber die 2 used for molding is readily made, which allows low-cost production of the thermoplastic resin molded product 60 of various shapes.

Further, when the thermoplastic resin 6 is molded using the rubber die 2, the transparent thermoplastic resin molded product 60 has effectively improved properties such as appearance, shape, and surface accuracy, and mechanical strength. The present example is markedly effective when the thermoplastic resin molded product 60 to be molded is large or thin-walled, or when the thermoplastic resin 6 used for molding has a high viscosity.

The structure of the molding machine 1 used in the present example is the same as that used in Example 1, and the structure and effect of the production process of the present example are the same as those in Example 2.

(Confirmatory Test 4)

The present confirmatory test examined whether or not the addition of an infrared ray absorbing agent reduces the time taken until the thermoplastic resin composition 6A melts.

Specifically, the resins 1 to 3 as thermoplastic resins containing no infrared ray absorbing agent were used as the comparisons 1 to 3, and the thermoplastic resin composition 6A made by adding an infrared ray absorbing agent to the resins 1 to 3 was used as the inventions 1 to 8. The inventions 1 to 8 and the comparisons 1 to 3 were measured for the time taken until they melt (in the present confirmatory test, the time taken until the temperature reached 260° C.) (minute) and the haze value (%) of the molded products. The temperature and time for obtaining the molded products were adjusted as needed.

In the present confirmatory test, the following thermoplastic resins 1 to 3 were subjected to the measurements.

(Resin 1) A transparent ABS resin ("TECHNO ABS 830" manufactured by Techno Polymer Co., Ltd., MER 30 g/10 min (220° C., 98N)), a test piece having a thickness of 2.5 mm giving a haze value of 4%.

(Resin 2) An acrylic resin ("ACRYPET VH001" manufactured by Mitsubishi Rayon Co., Ltd., MFR 2 q/10 min (230° C., 37.3N)), a test piece having a thickness of 2.5 mm giving a haze value of 0.2%.

(Resin 3) A polycarbonate resin ("NOVAREX 7020A" manufactured by Mitsubishi Engineering-Plastics Corporation, MER 30 g/10 min (300° C., 11.8N)), a test piece having a thickness of 2.5 mm giving a haze value of 0.4%.

The infrared ray absorbing agent was "Lumogen IR1050" manufactured by BASF.

Table 4 lists the constitutions of the inventions 1 to 8 and the comparisons 1 to 3, and their measurements of the melting time (minute) and the whiteness value (%).

TABLE 4

|  |  | Inventions ||||||||  Comparisons |||
|---|---|---|---|---|---|---|---|---|---|---|---|---|
|  |  | 1 | 2 | 3 | 4 | 5 | 6 | 7 | 8 | 1 | 2 | 3 |
| Resin 1 | (Parts | 100 | 100 | 100 |  |  |  |  |  | 100 |  |  |
| Resin 2 | by Mass) |  |  |  | 100 | 100 | 100 | 100 |  |  | 100 |  |
| Resin 3 |  |  |  |  |  |  |  |  | 100 |  |  | 100 |
| Infrared Ray Absorbing Agent |  | 0.005 | 0.01 | 0.05 | 0.005 | 0.01 | 0.03 | 0.05 | 0.01 |  |  |  |
| Haze Value | (%) | 7 | 9 | 17 | 3 | 5 | 9 | 15 | 5 | 4 | 0.2 | 0.4 |
| Melting Time (Time required for reaching 260° C.) | (Minutes) | 16 | 12 | 6 | 15 | 12 | 6 | 5 | 11 | 30 | 31 | 35 |

The inventions 1 to 8 were made as follows. An infrared ray absorbing agent was added to the resins 1 to 3 in the proportions listed in Table 4, and the mixture was extruded using a single screw extruder (diameter: 40 mm, cylinder temperature: 220 to 260° C.), to form transparent thermoplastic resin particles. From the transparent thermoplastic resin particles, thermoplastic resin particles having a number average particle size of 700 μm were made using an extruder equipped with a strand cutter (for micropellets) manufactured by Gala Industries, Inc. The thermoplastic resin particles had a bulk density of 0.63 g/cm$^3$ as measured according to JIS K7365.

The comparisons 1 to 3 were made by forming the resins 1 to 3 containing no infrared ray absorbing agent into thermoplastic resin particles having a number average particle size of 700 μm in the same manner as described above.

The cavity 22 of the rubber die 2 made of silicone rubber was made in the form of a rectangle having a length of 80 mm, a width of 55 mm, and a thickness of 2.5 mm, and heated with a halogen heater. The time taken until the normal temperature reached 260° C. (melting time) was measured.

In the present confirmatory test, the haze value was determined by measuring a test piece (molded product) having a length of 80 mm, a width of 55 cm, and a thickness of 2.5 mm with a haze meter (Haze-Gard Plus, manufactured by Gardner) according to JIS K7136. The smaller the haze value is, the higher the transparency is.

Table 4 indicates that the thermoplastic resin composition 6A containing an infrared ray absorbing agent achieves a higher haze value than the thermoplastic resin containing no infrared ray absorbing agent. On the other hand, those containing an infrared ray absorbing agent (the inventions 1 to 8) achieve markedly shorter melting time than those containing no infrared ray absorbing agent (comparisons 1 to 3). The higher the proportion of the infrared ray absorbing agent is, the shorter the melting time is. On the other hand, the higher the proportion of the infrared ray absorbing agent is, the greater the haze value is, and the lower the transparency is.

The above results suggest that the addition of an infrared ray absorbing agent to the thermoplastic resin allows reduction of the time taken until the thermoplastic resin melts, and the quick molding of the thermoplastic resin molded product 60 having a haze value of 20% or less.

Example 5

The thermoplastic resin composition 6A of the present example is to be filled into the cavity 22 of the rubber die 2 made of a rubber material, and heated to be melted by irradiation with electromagnetic waves having wavelengths ranging from 0.78 to 2 μm through the rubber die 2. The thermoplastic resin composition 6A contains 0.0005 to 0.1 parts by mass of an infrared ray absorbing agent, and 0.05 to 30 parts by mass of a coloring agent with reference to 100 parts by mass of the thermoplastic resin such that the thermoplastic resin molded product 60 has a whiteness value of 30% or more.

The thermoplastic resin used in the present example is an ABS resin which is a non-crystalline rubber-reinforced styrene resin.

Figure 10:
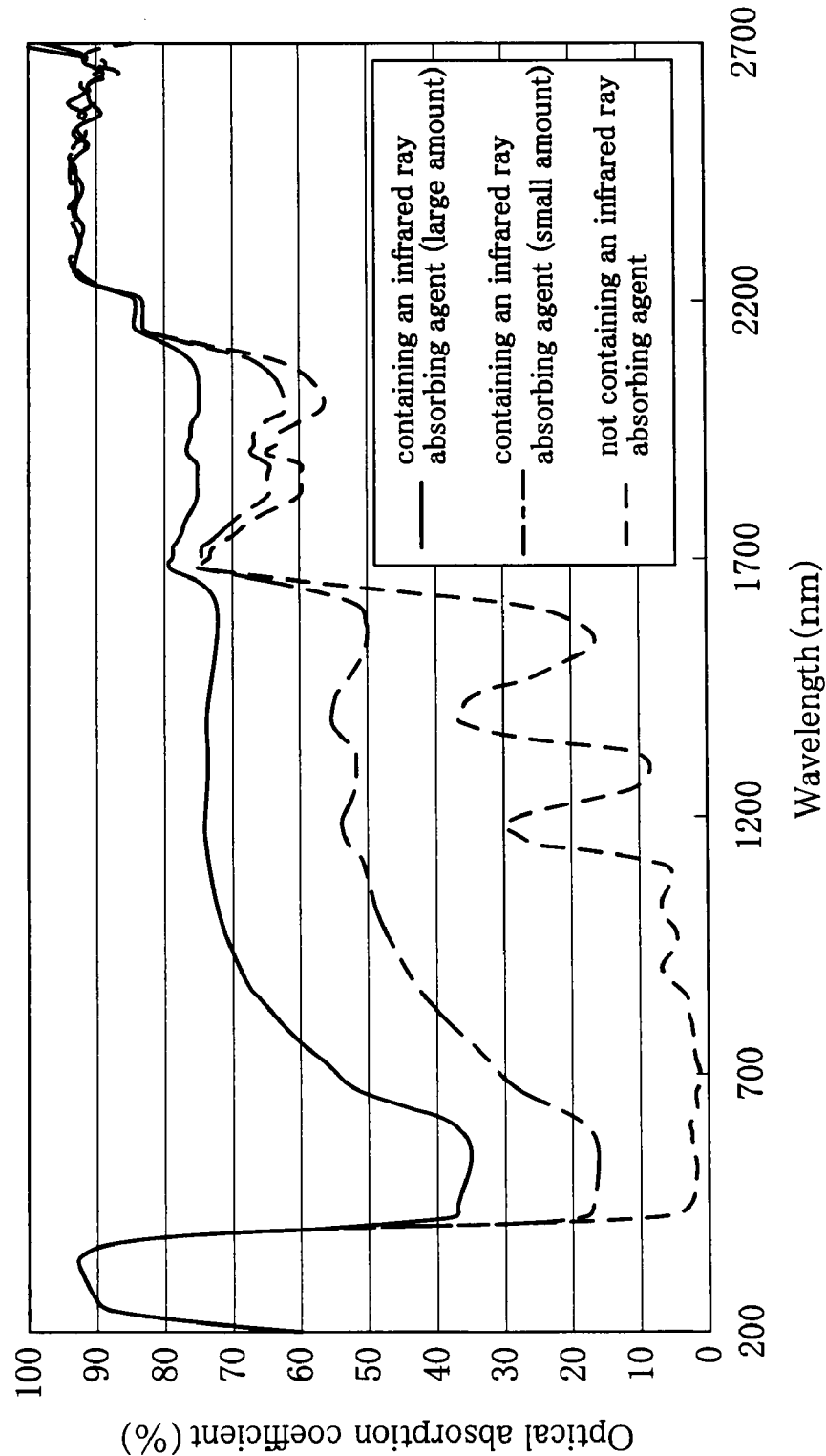
FIG. 10 shows graphs of the optical absorption coefficient (%) of the thermoplastic resins free of or containing an infrared ray absorbing agent in Example 5, taking the wavelength (nm) as abscissa, and the optical absorption coefficient (%) as ordinate.

FIG. 10 shows graphs showing the difference of the optical absorption coefficient between the thermoplastic resin containing no infrared ray (indicated with a broken line) and that containing an infrared ray absorbing agent (indicated with solid and dashed lines), taking the wavelength (nm) as abscissa, and the optical absorption coefficient (as ordinate. FIG. 10 indicates that the thermoplastic resin composition containing an infrared ray absorbing agent achieves a higher absorption coefficient of near-infrared rays having wavelengths from 0.78 to 2 μm than the thermoplastic resin containing no infrared ray absorbing agent. The thermoplastic resin containing no infrared ray absorbing agent corresponds to the comparison 1 in the below-described confirmatory test 5, and the thermoplastic resin containing an infrared ray absorbing agent corresponds to the invention 1 (containing a small amount of an infrared ray absorbing agent) and the invention 2 (containing a large amount of an infrared ray absorbing agent) in the below-described confirmatory test 5.

In the process of the present example for producing the thermoplastic resin molded product 60, in the same manner as in Example 4, the vacuum step, the particle heating step (see FIG. 2), and the filling step (see FIG. 3) are carried out, thereby obtaining the thermoplastic resin molded product 60 having good properties such as appearance, shape, and surface accuracy, and high mechanical strength.

In addition, in the production process of the present example, the large and small thermoplastic resin particles 61 and 62 used as the thermoplastic resin composition 6A contain an infrared ray absorbing agent, and a coloring agent in the same proportions. In the large and small thermoplastic resin particles 61 and 62 and the thermoplastic resin 6B in a molten state, the proportion of the coloring agent is from 0.05 to 30 parts by mass with reference to 100 parts by mass of the thermoplastic resin 6B.

Therefore, according to the process of the present example for producing the thermoplastic resin molded product 60, the addition of an infrared ray absorbing agent and a coloring agent allows quick molding of the thermoplastic resin molded product 60 having a whiteness value of 30% or more by irradiation with electromagnetic waves. In addition, the rubber die 2 used for molding is readily made, which allows low-cost production of the thermoplastic resin molded product 60 of various shapes.

The structure of the molding machine 1 used in the present example is the same as that used in Example 1, and the structure and effect of the production process of the present example are the same as those in Example 4.

(Confirmatory Test 5)

The present confirmatory test examined whether or not the addition of an infrared ray absorbing agent reduces the time taken until the thermoplastic resin composition 6A melts.

Specifically, the resins 1 and 2 as thermoplastic resins containing no infrared ray absorbing agent were used as the comparisons 1 to 3, and the thermoplastic resin composition 6A made by adding an infrared ray absorbing agent to the resins 1 and 2 was used as the inventions 1 to 4. The inventions 1 to 4 and the comparisons 1 to 3 were measured for the time taken until they melt (in the present confirmatory test, the time taken until the temperature reached 260° C.) (minute) and the whiteness value (%) of the molded products.

In the present confirmatory test, the following thermoplastic resins 1 and 2 were subjected to the measurements.

(Resin 1) A transparent ABS resin ("TECHNO ABS 830" manufactured by Techno Polymer Co., Ltd., PIER 30 g/10 min (220° C., 98N)), a test piece having a thickness of 2.5 mm giving a whiteness value of 97%.

(Resin 2) An ABS resin ("TECHNO ABS 330" manufactured by Techno Polymer Co., Ltd., MFR 42 g/10 min (220° C., 98N)), a test piece having a thickness of 2.5 mm giving a whiteness value of 34%.

The infrared ray absorbing agent was "Lumogen IR1050" manufactured by BASF.

In the confirmatory test, the following coloring agents 1 to 3 were used.

(Coloring agent 1) White, titanium oxide ("TIPAQUE CR-6-2" manufactured by Ishihara Sangyo Kaisha, Ltd.).

(Coloring agent 2) Green, ("AM110 GREEN, manufactured by Kawamura Chemical. Co., Ltd.).

(Coloring agent 3) Black, ("MB-9705 BLACK", manufactured by Koshigaya Kasei Co., Ltd.).

Table 5 lists the constitutions of the inventions 1 to 4 and the comparisons 1 to 3, and their measurements of the melting time (minute) and the whiteness value (%).

TABLE 5

| | | Inventions | | | | Comparisons | | |
| --- | --- | --- | --- | --- | --- | --- | --- | --- |
| | | 1 | 2 | 3 | 4 | 1 | 2 | 3 |
| Resin 1 | (Parts | 100 | 100 | 100 | | 100 | 100 | |
| Resin 2 | by Mass) | | | | 100 | | | 100 |
| Infrared Ray Absorbing Agent | | 0.01 | 0.05 | 0.01 | 0.01 | | | |
| Coloring Agent 1 (White) | | 3 | 3 | | 3 | 3 | | |
| Coloring Agent 2 (Green) | | | | 1 | | | 1 | |
| Coloring Agent 3 (Black) | | | | | | | | 1 |
| Whiteness Value | (%) | 89 | 78 | 33 | 87 | 97 | 34 | 22 |

TABLE 5-continued

|  |  | Inventions | | | | Comparisons | | |
| --- | --- | --- | --- | --- | --- | --- | --- | --- |
|  |  | 1 | 2 | 3 | 4 | 1 | 2 | 3 |
| Melting Time<br>(Time required for reaching 260° C.) | (Minutes) | 17 | 12 | 8 | 15 | 31 | 22 | 5 |

The inventions 1 to 4 were made as follows. An infrared ray absorbing agent and coloring agent were added to the resins 1 and 2 in the proportions listed in Table 5, and the mixture was extruded using a single screw extruder (diameter: 40 mm, cylinder temperature: 220 to 260° C.), to form colored thermoplastic resin particles. From the colored thermoplastic resin particles, thermoplastic resin particles having a number average particle size of 700 μm were made using an extruder equipped with a strand cutter (for micropellets) manufactured by Gala Industries, Inc. The thermoplastic resin particles had a bulk density of 0.63 g/cm$^3$ as measured according to JIS K7365.

The comparisons 1 to 3 were made by adding the coloring agents in the proportions listed in Table 5 to the resins 1 and 2, and forming them into thermoplastic resin particles having a number average particle size of 700 μm in the same manner as described above.

The cavity 22 of the rubber die 2 made of silicone rubber was made in the form of a rectangle having a length of 80 mm, a width of 55 mm, and a thickness of 2.5 mm, and heated with a halogen heater. The time taken until the normal temperature reached 260° C. (melting time) was measured.

In the present confirmatory test, the whiteness was determined by measuring the L, a, and b of a test piece (molded product) having a length of 80 mm, a width of 55 cm, and a thickness of 2.5 mm using a Hunter color difference meter, and calculated from the formula:

$$W(\%)=100-\{(100-L)^2+a^2+b^2\}^{1/2}$$

wherein L is brightness, a is redness, and b is yellowness. The higher the whiteness value is, the closer to white the test piece is.

Table 5 indicates that the thermoplastic resin composition 6A containing an infrared ray absorbing agent achieves a lower whiteness value than the thermoplastic resin containing no infrared ray absorbing agent. On the other hand, those containing an infrared ray absorbing agent (the inventions 1 to 4) achieve markedly shorter melting time than those containing no infrared ray absorbing agent (comparisons 1 to 3). The higher the proportion of the infrared ray absorbing agent is, the shorter the melting time is. On the other hand, the higher the proportion of the infrared ray absorbing agent is, the lower the whiteness value is.

The above results suggest that the addition of an infrared ray absorbing agent to the thermoplastic resin allows reduction of the time taken until the thermoplastic resin melts, and the quick molding of the thermoplastic resin molded product 60 having a whiteness of 30% or more.

The invention claimed is:

1. A process for producing a thermoplastic resin molded product, comprising:
   (A) placing a thermoplastic resin particle composition, comprising thermoplastic resin particles, into a cavity of a rubber die made of a rubber material;
   (B) irradiating the thermoplastic resin particle composition in the cavity with electromagnetic waves having wavelengths ranging from 0.78 to 2 μm through the rubber die, thereby heating to melt the thermoplastic resin particle composition and give a molten thermoplastic resin; and
   (C) cooling the molten thermoplastic resin in the cavity thereby obtaining a thermoplastic resin molded product, wherein
   the thermoplastic resin particle composition comprises 0.1 to 20% by mass of small thermoplastic resin particles having a particle size of 1 to 100 μm, a balance being large thermoplastic resin particles larger than the small thermoplastic resin particles.

2. The process of claim 1, further comprising, after the irradiating (B) and before the cooling (C):
   (X) filling an additional amount of the molten thermoplastic resin into a space left in the cavity.

3. The process of claim 2, wherein in the filling (X), the molten thermoplastic resin is filled into the space left in the cavity under an injection pressure of 0.5 to 5 MPa.

4. The process of claim 1, further comprising, at any time from before the placing (A) to before the irradiating (B):
   (Y) vacuuming the cavity or a space left in the cavity.

5. The process of claim 1, wherein a bulk density of the thermoplastic resin particle composition is 0.4 g/cm$^3$ or more.

6. The process of claim 1, wherein:
   the thermoplastic resin particle composition further comprises fine particles of at least one member selected from the group consisting of an inorganic powder and a lubricant;
   a number average particle size of the thermoplastic resin particles is from 200 to 3000 μm;
   a volume average particle size of the fine particles is from 0.5 to 50 μm; and
   a content of the fine particles is from 0.1 to 10 parts by mass with reference to 100 parts by mass of the thermoplastic resin particles.

7. A process for producing a thermoplastic resin molded product, comprising:
   (A) placing a thermoplastic resin particle composition, comprising thermoplastic resin particles, into a cavity of a rubber die made of a rubber material;
   (B) irradiating the thermoplastic resin particle composition in the cavity with electromagnetic waves having wavelengths ranging from 0.78 to 2 μm through the rubber die thereby heating to melt the thermoplastic resin particle composition and give a molten thermoplastic resin; and
   (C) cooling the molten thermoplastic resin in the cavity thereby obtaining a thermoplastic resin molded product, wherein
   the thermoplastic resin particle composition further comprises 0.0005 to 0.1 parts by mass of an infrared ray absorbing agent with reference to 100 parts by mass of the thermoplastic resin particles.

8. The process of claim 1, wherein the thermoplastic resin particle composition is a rubber-reinforced styrene resin.

9. A thermoplastic resin molded product obtained by the process of claim 1.

10. A thermoplastic resin particle composition, comprising:

0.1 to 20% by mass of small thermoplastic resin particles having a particle size of 1 to 100 μm, the balance being large thermoplastic resin particles larger than the small thermoplastic resin particles; and thermoplastic resin particles, wherein thermoplastic resin particle:

can be selectively heated and melted in a cavity of a rubber die by irradiation with electromagnetic waves having wavelengths ranging from 0.78 to 2 μm through the rubber die; and has a bulk density of 0.4 g/cm$^3$ or more.

11. The thermoplastic resin particle composition of claim 10, wherein the thermoplastic resin particle composition further comprises fine particles of at least one member selected from the group consisting of an inorganic powder and a lubricant, wherein:

the thermoplastic resin particles have a number average particle size of 200 to 3000 μm;

a volume average particle size of the fine particles being from 0.5 to 50 μm; and a content of the fine particles being from 0.1 to 10 parts by mass with reference to 100 parts by mass of the thermoplastic resin particles.

12. A thermoplastic resin particle composition, comprising:

thermoplastic resin particles, and 0.0005 to 0.1 parts by mass of an infrared ray absorbing agent with reference to 100 parts by mass of the thermoplastic resin particles, wherein thermoplastic resin particle:

can be selectively heated and melted in a cavity of a rubber die by irradiation with electromagnetic waves having wavelengths ranging from 0.78 to 2 μm through the rubber die; and has a bulk density of 0.4 g/cm$^3$ or more.

13. The process of claim 2, further comprising, at any time from before the placing (A) to before the irradiating (B):

(Y) vacuuming the cavity or a space left in the cavity.

14. The process of claim 3, further comprising, at any time from before the placing (A) to before the irradiating (B):

(Y) vacuuming the cavity or a space left in the cavity.

15. The process of claim 2, wherein a bulk density of the thermoplastic resin particle composition is 0.4 g/cm$^3$ or more.

16. The process of claim 3, wherein a bulk density of the thermoplastic resin particle composition is 0.4 g/cm$^3$ or more.

17. The process of claim 4, wherein a bulk density of the thermoplastic resin particle composition is 0.4 g/cm$^3$ or more.

18. The process of claim 13, wherein a bulk density of the thermoplastic resin particle composition is 0.4 g/cm$^3$ or more.

19. The process of claim 7, wherein:

the thermoplastic resin particle composition further comprises fine particles of at least one member selected from the group consisting of an inorganic powder and a lubricant;

a number average particle size of the thermoplastic resin particles is from 200 to 3000 μm;

a volume average particle size of the fine particles is from 0.5 to 50 μm; and a content of the fine particles is from 0.1 to 10 parts by mass with reference to 100 parts by mass of the thermoplastic resin particles.

20. The thermoplastic resin particle composition of claim 12, wherein the thermoplastic resin particle composition further comprises fine particles of at least one member selected from the group consisting of an inorganic powder and a lubricant, wherein:

the thermoplastic resin particles have a number average particle size of 200 to 3000 μm;

a volume average particle size of the fine particles being from 0.5 to 50 μm; and a content of the fine particles being from 0.1 to 10 parts by mass with reference to 100 parts by mass of the thermoplastic resin particles.

\* \* \* \* \*